United States Patent
Kim et al.

(10) Patent No.: US 12,548,604 B2
(45) Date of Patent: Feb. 10, 2026

(54) RECEIVER, OPERATION METHOD THEREOF, AND MEMORY DEVICE

(71) Applicant: Samsung Electronics Co., Ltd., Suwon-si (KR)

(72) Inventors: Jueon Kim, Suwon-si (KR); Taehyoung Kim, Suwon-si (KR); Donghyun Yoon, Suwon-si (KR); Myoungbo Kwak, Suwon-si (KR); Jaewoo Park, Suwon-si (KR); Youngdon Choi, Suwon-si (KR); Junghwan Choi, Suwon-si (KR)

(73) Assignees: Samsung Electronics Co., Ltd., Suwon-si (KR); Nanyang Technological University, Singapore (SG)

( * ) Notice: Subject to any disclaimer, the term of this patent is extended or adjusted under 35 U.S.C. 154(b) by 101 days.

(21) Appl. No.: 18/419,959

(22) Filed: Jan. 23, 2024

(65) Prior Publication Data

US 2024/0412764 A1    Dec. 12, 2024

(30) Foreign Application Priority Data

Jun. 12, 2023    (KR) .................. 10-2023-0075066

(51) Int. Cl.
*G11C 7/10*    (2006.01)
*G11C 7/22*    (2006.01)

(52) U.S. Cl.
CPC .......... *G11C 7/1039* (2013.01); *G11C 7/1063* (2013.01); *G11C 7/222* (2013.01); *G11C 2207/2254* (2013.01)

(58) Field of Classification Search
CPC ..... G11C 7/1039; G11C 7/1063; G11C 7/222; G11C 2207/2254; H04L 7/0083; H04L 7/0016
See application file for complete search history.

(56) References Cited

U.S. PATENT DOCUMENTS 11,038,667 B2    6/2021    Lee et al.
11,095,487 B1    8/2021    Yonar et al.
(Continued)

FOREIGN PATENT DOCUMENTS

KR    20190073238 A    6/2019
KR    20220011226 A    1/2022
KR    102449951 B1    10/2022

OTHER PUBLICATIONS

Won et al. "A 28-Gbs Receiver With Self-contained Adaptive Equalization and Sampling Point Control Using Stochastic Sigma-Tracking Eye-Opening Monitor" IEEE Transactions on Circuits and Systems I: Regular Papers 64 (3):664-674 (Mar. 2017).

*Primary Examiner* — Sultana Begum
(74) *Attorney, Agent, or Firm* — Wolf, Greenfield & Sacks, P.C.

(57) ABSTRACT

A receiver includes a decoding circuit configured to convert a data signal into first and second signals having a time difference therebetween, which is a function of at least one parameter, and output decoded data based on the first signal and the second signal. A calibration circuit is provided, which is configured to calibrate a value of the at least one parameter based on one of the first signal and the second signal, and a reference timing signal, and provide a calibration signal including the calibrated value to the decoding circuit. The reference timing signal may have a reference timing that sets a ratio between a first probability and a second probability as an integer ratio.

20 Claims, 23 Drawing Sheets

(56) References Cited

U.S. PATENT DOCUMENTS

| | | |
|---|---|---|
| 2022/0070032 A1 | 3/2022 | Zerbe et al. |
| 2022/0190999 A1 | 6/2022 | Ju et al. |
| 2022/0286329 A1 | 9/2022 | Navid |
| 2022/0311449 A1 | 9/2022 | Tachibana |
| 2022/0393913 A1 | 12/2022 | Orhan et al. |

RECEIVER, OPERATION METHOD THEREOF, AND MEMORY DEVICE

REFERENCE TO PRIORITY APPLICATION

This application claims priority under 35 U.S.C. § 119 to Korean Patent Application No. 10-2023-0075066, filed Jun. 12, 2023, the disclosure of which is hereby incorporated herein by reference.

BACKGROUND

The inventive concept relates to integrated circuit devices and, more particularly, to receivers that can be used in memory devices and methods of operating same.

High-speed transmission systems capable of high-speed data transmission are increasingly attracting attention. Demand for high-speed transmission systems is increasing in multimedia and other fields that require transmission of large amounts of data. Data transmission schemes can include a non-return to zero (NRZ) scheme and a pulse-amplitude modulation (PAM)-N scheme, for example. As will be understood by those skilled in the art, a NRZ scheme transmits 1 bit of data during 1 unit interval (UI), whereas the PAM-N scheme transmits k-bit (k satisfying 2k=N) data during 1 UI. For example, in the PAM-4 scheme, 2-bit data may be transmitted.

As the amount of data exchanged between devices and systems increases, communication circuits capable of transmitting and receiving signals at high speed are being adopted. Electronic devices can be connected through a communication channel, and the communication channel may transfer signals transmitted and received between the electronic devices. However, the bandwidth of the communication channel may be limited due to various factors, such as skin effect and dielectric loss. These factors may attenuate high-frequency components of signals transmitted through a communication channel and thus degrade the quality of signals transmitted at high speeds. As a method of improving signal quality, a method of calibrating characteristics of a receiver is being studied.

SUMMARY

The inventive concept provides a receiver for calibrating characteristics of the receiver using a probabilistic method, an operation method thereof, and a memory device including the receiver.

According to an aspect of the inventive concept, there is provided a receiver including a decoding circuit, which is configured to convert a data signal into a first signal and a second signal having a specific time difference based on at least one parameter. The decoding circuit is further configured to output decoded data based on the first signal and the second signal. A calibration circuit is provided, which is configured to: (i) calibrate a value of the at least one parameter based on one of the first signal and the second signal and a reference timing signal, and (ii) provide a calibration signal including the calibrated parameter to the decoding circuit. The reference timing signal may have a reference timing for setting a ratio between a first probability and a second probability as an integer ratio, with the first probability being a probability that the decoded data is decoded as a reference symbol among a plurality of symbols, and the second probability being a probability that the decoded data is decoded as any one symbol among the plurality of symbols.

The inventive concept also provides methods of operating a receiver including: converting a data signal into a first signal and a second signal having a specific time difference based on at least one parameter, calibrating a value of the at least one parameter based on one of the first signal and the second signal and a reference timing signal, and outputting decoded data based on the first signal and the second signal. The reference timing signal can have a reference timing for setting a ratio between a first probability and a second probability as an integer ratio. The first probability may be a probability that the decoded data is decoded as a reference symbol among a plurality of symbols, and the second probability may be a probability that the decoded data is decoded as any one symbol among the plurality of symbols.

The inventive concept also provides a memory device including a memory interface circuit configured to receive a data signal from a memory controller, and a control logic circuit configured to perform a control operation based on the data signal provided from the memory interface circuit. The memory interface circuit includes a decoding circuit that is configured to: (i) convert a data signal into a first signal and a second signal having a specific time difference based on at least one parameter, and (ii) output decoded data based on the first signal and the second signal. The memory interface circuit also includes a calibration circuit configured to: calibrate a value of the at least one parameter based on one of the first signal and the second signal and a reference timing signal, and provide a calibration signal including the calibrated parameters to the decoding circuit. The reference timing signal may have a reference timing for setting a ratio between a first probability and a second probability as an integer ratio, with the first probability being a probability that the decoded data is decoded as a reference symbol among a plurality of symbols, and the second probability being a probability that the decoded data is decoded as any one symbol among the plurality of symbols.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Hereinafter, embodiments of the inventive concept are described in detail with reference to the accompanying drawings.

Figure 1:
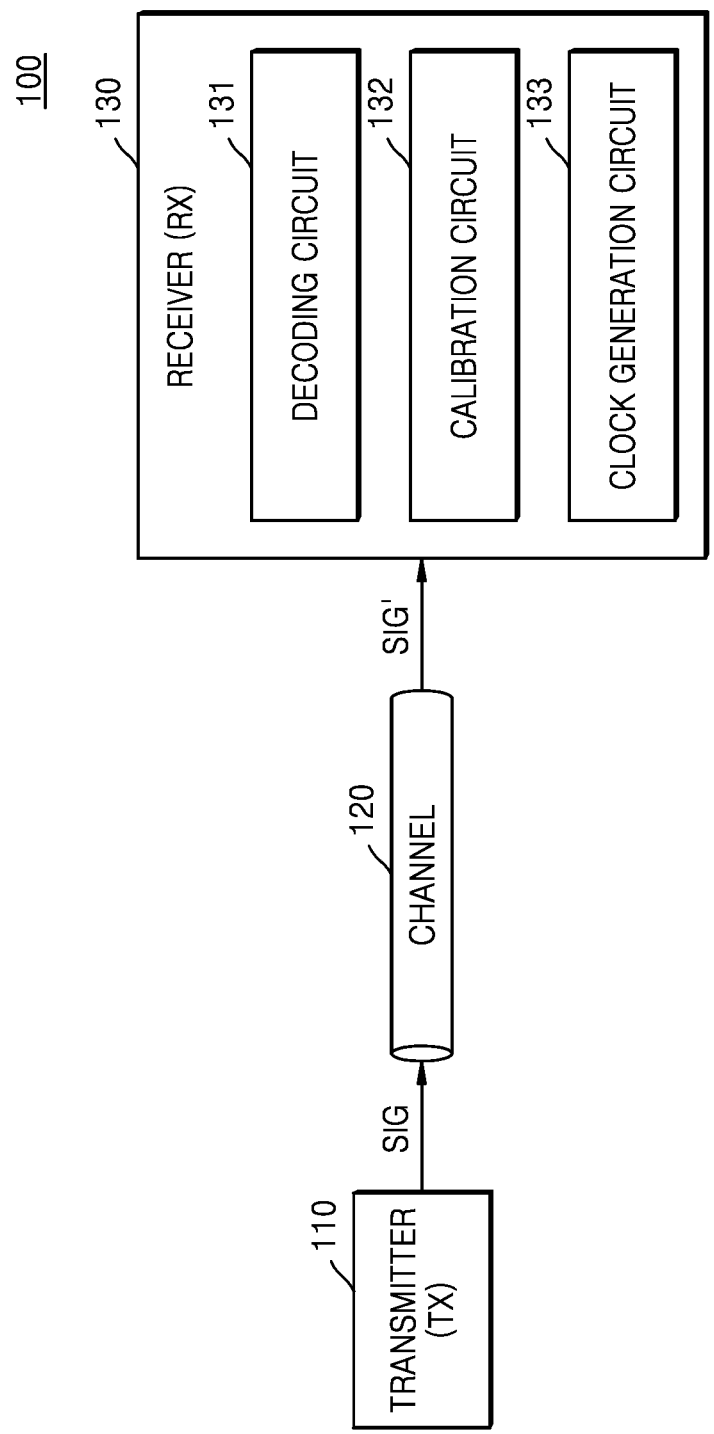
FIG. 1 is a block diagram that highlights a system including a transceiver according to embodiments.

FIG. 1 is a diagram for explaining a transceiver 100 according to embodiments of the inventive concept, which can include a transmitter 110 and a receiver 130 that are configured to communicate with each other through a channel 120, as shown. The transmitter 110 may output a signal SIG for delivery to the receiver 130 via the channel 120. In some embodiments, the transmitter 110 may convert parallel data into serial data and output the signal SIG as a serial data stream. In some other embodiments, in addition to data serialization, the transmitter 110 may also perform a signal equalization operation to compensate for channel loss. The signal SIG of the inventive concept may be referred to as a transmission signal.

In some embodiments, the transmitter 110 may transmit the signal SIG in a pulse-amplitude modulation (PAM)-N (where N is an integer greater than or equal to 3) scheme (e.g., PAM-N signaling scheme, PAM-N decoding scheme, or PAM-N mode, etc.) In this case, the signal SIG may have any one voltage level among N different voltage levels based on PAM-N. In the PAM-4 scheme, the transmitter 110 may transmit the signal SIG having one of four voltage levels. The four voltage levels may respectively correspond to first to fourth logic values (e.g., bit values) (e.g., '00' (=00b), '01' (=01b), '10' (=10b), '11' (=11b)). However, the voltage levels are not limited thereto. Based on various schemes, such as PAM-8 and PAM-16, the signal SIG may have one of 8 voltage levels or 16 voltage levels, for example. In some further embodiments, the signal SIG may be a single signal as a data signal. However, the signal SIG is not limited thereto, and in other embodiments, the signal SIG may include two differential signals having different polarities.

The channel 120 may be an electrical path connecting the transmitter 110 and the receiver 130 to each other. For example, the channel 120 may include a trace on a printed circuit board (PCB) or a coaxial cable. The channel 120 may degrade high-frequency contents of high-speed random data due to skin effect, dielectric loss, and the like. That is, channel loss may occur in the signal SIG transmitted through the channel 120. In addition, the channel 120 may introduce impedance discontinuities (mismatches) due to connectors and other physical interfaces between boards and cables. In addition, each of the bits of data that have passed through the channel 120 may interfere with the next bit due to channel loss or bandwidth limitations, and intersymbol interference (ISI), a phenomenon in which a bit error rate (BER) increases as neighboring symbols overlap, may occur. Due to the phenomena caused by the channel 120 described above, the signal SIG' that passes through the channel 120 may be partially distorted or partially deformed compared to the originally transmitted signal SIG. When the signal SIG according to some embodiments is a single signal, the signal SIG' may also be a single signal as a data signal. The signal SIG' of the inventive concept may be referred to as a received signal. The data signal may include, for example, a specific logical value (or bit value), such as a command, address, or data.

The receiver 130 may receive the signal SIG' passing through the channel 120. The receiver 130 may decode data based on the signal SIG' and output decoded data. In some embodiments, the receiver 130 may convert the serial data received from the transmitter 110 into parallel data. In some other embodiments, the transmitter 110 may perform a signal equalization operation to compensate for channel loss in addition to a data parallelization operation.

In some embodiments, the receiver 130 may be implemented as a time-based receiver, and may include, among other circuits, a decoding circuit 131, a calibration circuit 132, and a clock generation circuit 133. The decoding circuit 131 may convert the received signal SIG' into a first signal and a second signal based on at least one parameter, and that parameter may be a value representing a characteristic necessary for the receiver 130 to decode the signal SIG'. A specific time difference may occur between the first signal and the second signal. For example, the first signal and the second signal may be sequentially output with a specific time difference. The decoding circuit 131 may output decoded data based on the first signal and the second signal. The decoded data may include a plurality of bit values corresponding to any one symbol among a plurality of symbols in the PAM-N scheme. For example, data decoded in the PAM-4 scheme may include 2 bits, and the 2 bits may correspond to any one symbol of '00', '01', '10', and '11'.

The calibration circuit 132 may calibrate the value of at least one parameter based on any one of the first signal and the second signal and a reference timing signal. The calibration circuit 132 may provide a calibration signal including the calibrated parameters to the decoding circuit 131. The reference timing signal may be a signal having reference timing for setting a ratio between a first probability and a second probability as an integer ratio. The first probability may be a probability that decoded data is decoded as a reference symbol among a plurality of symbols. The second probability may be a probability that the decoded data is decoded as any one symbol among a plurality of symbols. An integer ratio may mean, for example, 1:1, 1:2, 1:3, 2:3, and the like. For example, even if the ratio between the first probability and the second probability is 0.8:0.2, it is assumed that the ratio (e.g., 0.8:0.2) is an integer ratio.

The clock generation circuit 133 may generate a clock signal. The clock signal may be a signal providing timing necessary for the decoding circuit 131 and/or the calibration circuit 132 to operate. In some embodiments, the clock generation circuit 133 may be included inside the receiver 130. However, it is not limited thereto, and in other embodiments, the clock generation circuit 133 may be provided external to the receiver 130. According to other embodiments, the clock signal may be transmitted by the transmitter 110 to the receiver 130. Although not wishing to be bound by any theory of operation, calibrating the parameters using a stochastic method has the effect of providing the receiver 130 and/or transceiver 100 that is insensitive to environmental changes (process, voltage, temperature (PVT) fluctuations), reducing BER, and improving ISI.

Figure 2A:
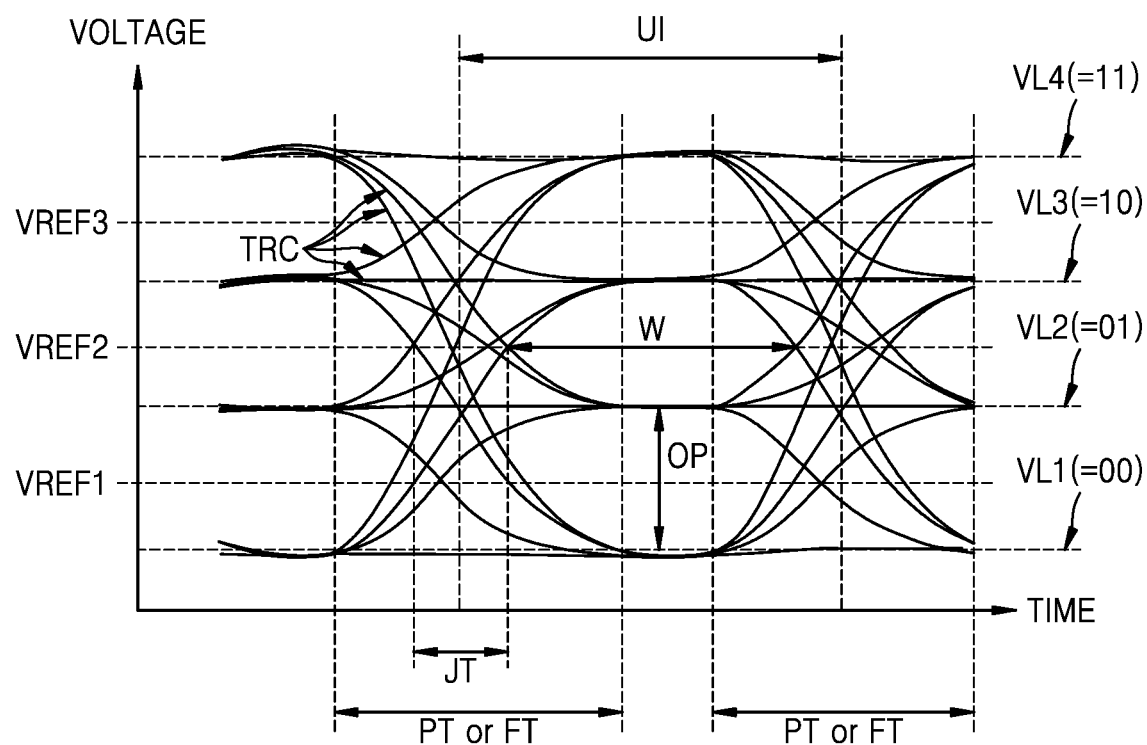
FIG. 2A is a timing diagram for explaining signals input to a receiver according to the inventive concept.
Figure 2B:
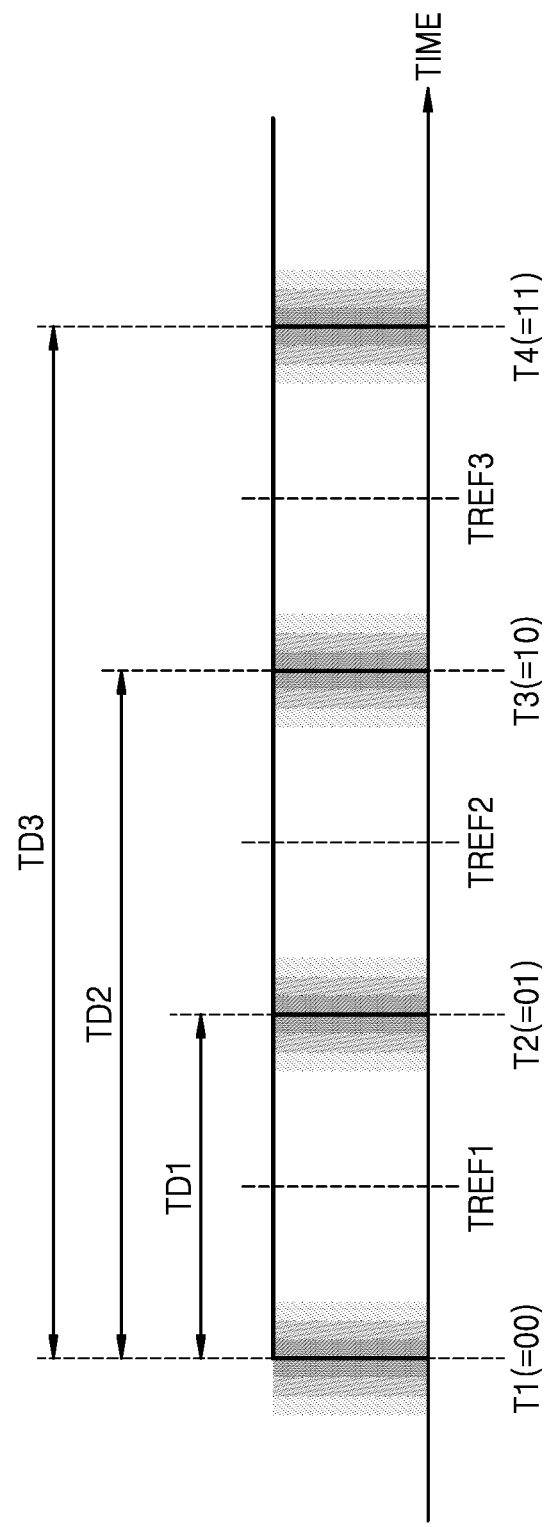
FIG. 2B is a diagram for explaining a method of converting the voltage levels of FIG. 2A to time.

FIG. 2A is a diagram for explaining signals input to a receiver according to the inventive concept and FIG. 2B is a diagram for explaining a method of converting the voltage levels of FIG. 2A to time. In detail, FIG. 2A may show an eye diagram for a signal generated by the PAM-4 scheme, that is, a PAM-4 signal. FIG. 2B is a graph in which the voltage level of the PAM-4 signal is converted based on time.

Referring to FIG. 2A, waveforms in which bits of serially transmitted data are overlapped may resemble the shape of an eye. This waveform may be referred to as an eye diagram. The eye diagram may be used to indicate the quality of a signal SIG' in high-speed transmission. For example, in PAM-4, the eye diagram may represent four symbols (e.g., '00', '01', '10', and '11') of the signal SIG', and each of the four symbols may be represented by different first to fourth voltage levels VL1, VL2, VL3, and VL4. The eye diagram may be used to visually represent signal integrity and may represent the noise margin of the signal SIG'.

To generate the eye diagram, an oscilloscope or another computing device may sample signal SIG' based on a unit interval UI (e.g., a sample period or a bit period). The unit interval UI may be defined by a clock associated with transmission of the signal SIG'. The oscilloscope or another computing device may form traces TRC by measuring the voltage level of the signal SIG' during the unit interval UI. By overlapping the plurality of traces TRC, various characteristics of the measured signal SIG' may be determined.

The eye diagrams may be used to identify a number of signal characteristics, such as jitter, crosstalk, signal loss, signal-to-noise ratio (SNR), and other characteristics. For example, the eye width W may be used to indicate timing synchronization of the measured signal SIG' or jitter effects in the measured signal SIG'.

An eye opening OP represents the peak-to-peak voltage difference between various first to fourth voltage levels VL1, VL2, VL3, and VL4 and may be related to a voltage margin for distinguishing the first to fourth voltage levels VL1, VL2, VL3, and VL4. In order to evaluate the performance of the transceiver 100, the eye opening OP may be measured in the eye diagram. Rising time RT or falling time FT may represent the time required to transition from one voltage level to another voltage level and may be associated with a rising edge and a falling edge, respectively. The slope of the trace TRC during the rising time RT or falling time FT may represent the sensitivity of the signal SIG' to timing errors. Jitter (JT) represents timing error due to misalignment of the rising time and the falling time, occurs when a rising or falling edge occurs at a different time than the ideal time defined by the data clock, and may be caused by signal reflections, ISI, crosstalk, PVT variations, random jitter, additive noise, or a combination thereof.

As shown in FIG. 2A, the first voltage level VL1 may be lower than the second voltage level VL2, the second voltage level VL2 may be lower than the third voltage level VL3, and the third voltage level VL3 may be lower than the fourth voltage level VL4. The receiver 130 may set the first to third reference levels VREF1, VREF2, and VREF3 in PAM-4. The first reference level VREF1 may be lower than the second reference level VREF2, and the second reference level VREF2 may be lower than the third reference level VREF3. The receiver 130 may decode the symbol of the signal SIG' by comparing the voltage level of the signal SIG' with the first to third reference levels VREF1, VREF2, and VREF3.

A first eye may be located between the first and second voltage levels VL1 and VL2, a second eye may be located between the second and third voltage levels VL2 and VL3, and a third eye may be located between the third and fourth voltage levels VL3 and VL4.

Some edges may affect characteristics of each of the eyes (e.g., the size or shape of the eye). For example, a falling edge from the fourth voltage level VL4 to the first voltage level VL1 (i.e., '11'->'00'), a rising edge from the first voltage level VL1 to the second voltage level VL2 (i.e., '00'->'01'), a rising edge from the first voltage level VL1 to the fourth voltage level VL4 (i.e., '00'->'11'), and a falling edge (i.e., '01'->'00') from the second voltage level VL2 to the first voltage level VL1 may determine the characteristics of the first eye. In another example, a rising edge and a falling edge (i.e., '01'<->'11') between the second and fourth voltage levels VL2 and VL4 and a rising edge and a falling edge (i.e., '00'<->'10') between the first and third voltage levels VL1 and VL3 may determine the characteristics of the second eye. In another example, a rising edge and a falling edge (i.e., '10'<->'11') between the third and fourth voltage levels VL3 and VL4 and a rising edge and a falling edge (i.e., '00'<->'11') between the first and fourth voltage levels VL1 and VL4 may determine the characteristics of the third eye. Thus, an equalization or equalizing operation may be required for the edges that determine the characteristics of the eye.

Referring to FIGS. 2A and 2B, the receiver 130 according to some embodiments may be implemented as a time-based receiver. The circuit configuration included in the receiver 130 according to some embodiments is relatively simple, and the receiver 130 according to some embodiments may have a greater gain at a relatively low voltage. In the receiver 130 according to some embodiments, the first to fourth voltage levels VL1, VL2, VL3, and VL4 of FIG. 2A may correspond to signals having edges occurring at a specific time in FIG. 2B. For example, the first voltage level VL1 may correspond to a signal having an edge occurring at a first time T1, the second voltage level VL2 may correspond to a signal having an edge occurring at a second time T2 after the first time T1, the third voltage level VL3 may correspond to a signal having an edge occurring at a third time T3 after the second time T2, and the fourth voltage level VL4 may correspond to a signal having an edge occurring at a fourth time T4 after the third time T3. The first to fourth times T1, T2, T3, and T4 may be referred to as edge timing (or "timing", for convenience herein).

A first time difference TD1 may occur between the first time T1 and the second time T2, between the second time T1 and the third time T3, or between the third time T1 and the fourth time T4. A second time difference TD2 may occur between the first time T1 and the third time T3 or between the second time T1 and the fourth time T4. A third time difference TD3 may occur between the first time T1 and the fourth time T4. The first time difference TD1 may be less than the second time difference TD2, and the second time difference TD2 may be less than the third time difference TD3. In some embodiments, the second time difference TD2 may be twice the first time difference TD1, and the third time difference TD3 may be three times the first time difference TD1.

The first to third reference levels VREF1, VREF2, and VREF3 of FIG. 2A may correspond to the first to third reference times TREF1, TREF2, and TREF3, respectively. For example, the first reference level VREF1 may correspond to the first reference time TREF1, the second reference level VREF2 may correspond to the second reference time TREF2, and the third reference level VREF3 may correspond to the third reference time TREF3. The first reference time TREF1 may be shorter than the second reference time TREF2, and the second reference time TREF2 may be shorter than the third reference time TREF3.

The receiver 130 according to the inventive concept may change the voltage level of the signal SIG' to a signal having an edge signal occurring at a certain time and may decode the symbol of the signal SIG' using the edge occurrence time (e.g., edge timing) and the first to third reference times TREF1, TREF2, and TREF3.

The embodiments shown in FIGS. 2A and 2B have been described based on the PAM-4 signal but are not limited thereto. For example, the number of different voltage levels and the number of edge timings in the PAM-8 signal may be 8, the number of reference levels for distinguishing the 8 voltage levels may be 7, and the number of reference times for classifying the 8 edge timings may be 7. In another example, in the PAM-16 signal, the number of voltage levels and the number of edge timings may be 16, and the number of reference levels and the number of reference times may be 15.

Figure 3:
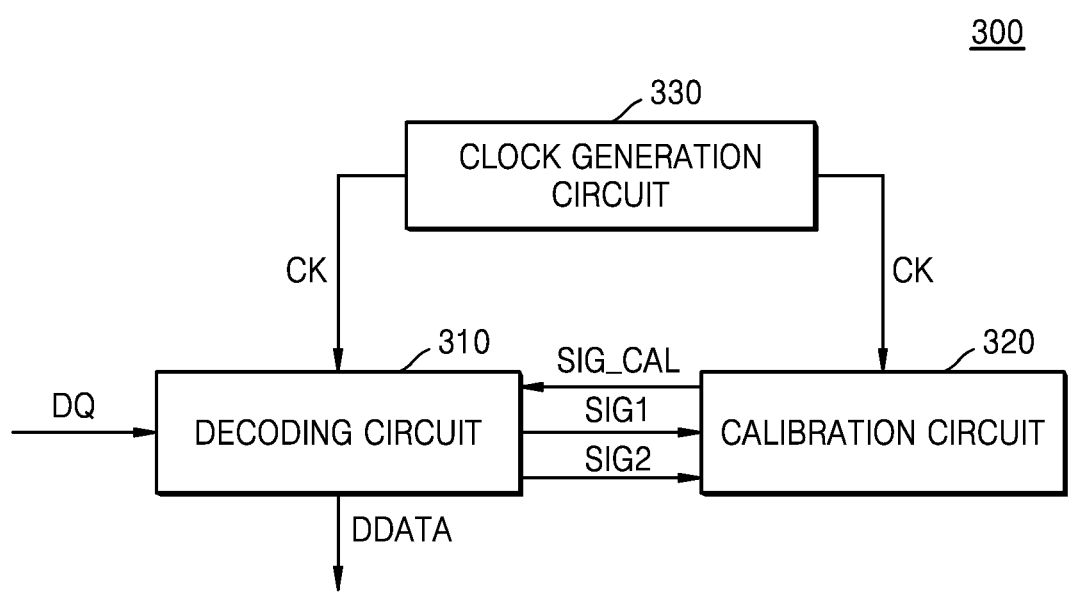
FIG. 3 is a block diagram illustrating a receiver according to embodiments.

FIG. 3 is a block diagram illustrating a time-based receiver 300, which may include a decoding circuit 310, a calibration circuit 320, and a clock generation circuit 330, electrically coupled as illustrated. The decoding circuit 310 may receive a data signal DQ, a clock signal CK, and a calibration signal SIG_CAL from the outside. The data signal DQ may correspond to the received signal SIG' of FIG. 1. The data signal DQ may be a PAM-N signal. The calibration signal SIG_CAL may include parameter values. When the number of parameters is two or more, the number of calibration signals SIG_CAL may be two or more. The decoding circuit 310 may convert the data signal DQ into a first signal SIG1 and a second signal SIG2 based on at least one parameter and may output the first signal SIG1 and the second signal SIG2 to the calibration circuit 320. The decoding circuit 310 may output decoded data DDATA based on the first signal SIG1 and the second signal SIG2.

A circuit configuration included in the decoding circuit 310 is relatively simple, and the decoding circuit 310 may have a greater gain at a relatively low voltage. However, because the decoding operation (or data processing operation) performed by the decoding circuit 310 is performed as a function of time, the decoding operation may be sensitive to the delay time conversion of the logic gate(s). In addition, the calibration circuit 320 may receive the first signal SIG1, the second signal SIG2, and the clock signal CK. The calibration circuit 320 may generate a reference timing signal (not shown) based on the clock signal CK. The calibration circuit 320 may output the calibration signal SIG_CAL including calibrated parameters to the decoding circuit 310, based on any one selected from the first signal SIG1 and the second signal SIG2 and the reference timing signal. Finally, as shown, the clock generation circuit 330 may output the clock signal CK to the decoding circuit 310 and the calibration circuit 320.

Figure 4:
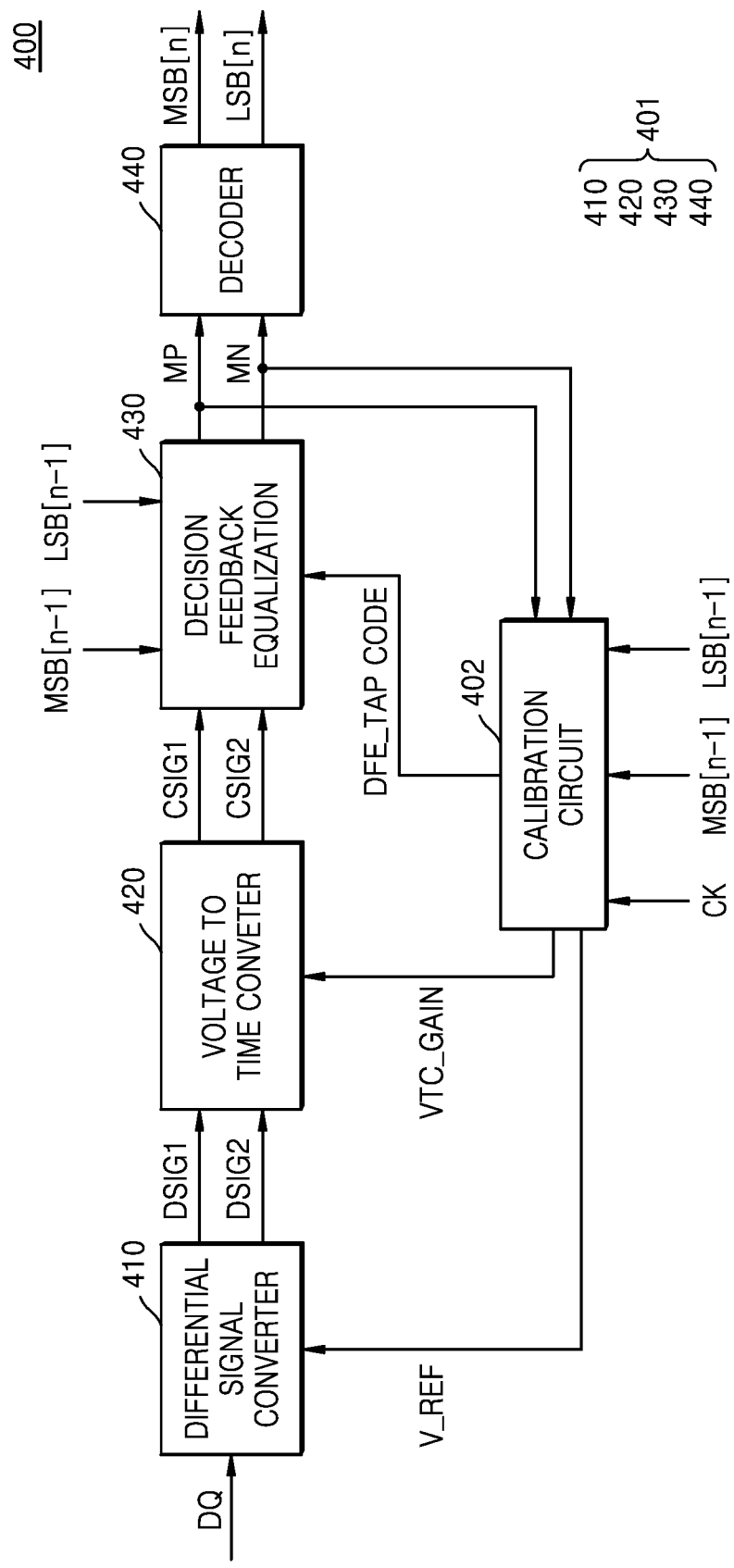
FIG. 4 is a diagram illustrating some embodiments of the receiver of FIG. 3.

FIG. 4 is a diagram illustrating some embodiments of the receiver of FIG. 3. In particular, as shown by FIG. 4, a receiver 400 may include a decoding circuit 401 and a calibration circuit 402. The decoding circuit 401 may include a differential signal converter 410, a voltage-to-time converter 420, a decision feedback equalization (DFE) 430, and a decoder 440.

The differential signal converter 410 may receive a data signal DQ, a clock signal CK, and a first calibration signal V_REF. The first calibration signal V_REF may be a signal indicating a first parameter such as a reference voltage level. The voltage level of the first calibration signal V_REF may correspond to the value of the first parameter, that is, the reference voltage level. The differential signal converter 410 may be configured to convert the data signal DQ into a first differential signal DSIG1 and a second differential signal DSIG2. For example, the differential signal converter 410 may compare the voltage level of the data signal DQ with the voltage level (e.g., a reference voltage level) of the first calibration signal V_REF in response to the clock signal CK and may output a first differential signal DSIG1 and a second differential signal DSIG2 each having a specific voltage level based on the comparison result. The first differential signal DSIG1 and the second differential signal DSIG2 may have polarities opposite to each other, and be treated herein as "differential" signals. For example, when the voltage level of the data signal DQ is equal to or greater than the reference voltage level, the differential signal converter 410 may output a first differential signal DSIG1 having a positive polarity and a second differential signal DSIG2 having a negative polarity. When the voltage level of the data signal DQ is lower than the reference voltage level, the differential signal converter 410 may output a first differential signal DSIG1 having a negative polarity and a second differential signal DSIG2 having a positive polarity. In another example, the voltage levels of the first differential signal DSIG1 and the second differential signal DSIG2 may be determined depending on the difference between the voltage level of the data signal DQ and the reference voltage level. The differential signal converter 410 of the inventive concept may be referred to as a signal to differential (S2D) amplifier. Because the receiver 400 is a time-based receiver, signal integrity may be affected by offsets in the magnitude of the reference voltage supplied to the differential signal converter 410.

The voltage time converter 420 may receive a clock signal CK, a second calibration signal VTC_GAIN, a first differential signal DSIG1, and a second differential signal DSIG2. The second calibration signal VTC_GAIN may be a signal indicating a second parameter representing a voltage time gain. The voltage time gain may be the ratio of edge timing to unit voltage level. For example, when the unit voltage level is 1 [V] and the edge timing is 10 [ps], the voltage time gain may be 10 [ps/V]. That is, when the voltage difference between the first differential signal DSIG1 and the second differential signal DSIG2 is 1 V, a first conversion signal CSIG1 and a second conversion signal CSIG2 having a time difference of 10 [ps] may be output. The voltage level of the second calibration signal VTC_GAIN may correspond to the value of the first parameter, that is, the voltage time gain. The voltage time converter 420 may be configured to sequentially output the first conversion signal CSIG1 and the second conversion signal CSIG2 based on the first differential signal DSIG1 and the second differential signal DSIG2. In some embodiments, the voltage time converter 420 may convert a level difference between the voltage level of the first conversion signal CSIG1 and the voltage level of the second conversion signal CSIG2 into a time difference by using the voltage time gain, and may sequentially output the first conversion signal CSIG1 and the second conversion signal CSIG2 with a time difference. A time difference between the first conversion signal CSIG1 and the second conversion signal CSIG2 may correspond to a voltage level difference between the first differential signal DSIG1 and the second differential signal DSIG2. For example, the voltage time converter 420 may output the first conversion signal CSIG1 having the first edge timing with respect to the first voltage level of the first differential signal DSIG1 by using the voltage time gain. Also, the voltage time converter 420 may output the second conversion signal CSIG2 having the second edge timing for the second voltage level of the second differential signal DSIG2 by using the voltage time gain. A time difference between the first edge timing and the second edge timing may correspond to a voltage level difference between the first differential signal DSIG1 and the second differential signal DSIG2.

The DFE 430 is a non-linear equalizer and may cancel or at least substantially reduce ISI of currently sampled data using previously sampled data. That is, the DFE 430 may restore the distorted signal to a signal having an original shape. The DFE 430 may receive the first conversion signal CSIG1, the second conversion signal CSIG2, and a third calibration signal DFE_TAP CODE. The third calibration signal DFE_TAP CODE may include a code for adjusting the DFE tap coefficient. The code for adjusting the DFE tap coefficient may be, for example, 4 bits (e.g., <3:0>) but is not limited thereto. The DFE 430 may output a first signal MP and a second signal MN having an adjusted time difference, based on the third calibration signal DFE_TAP CODE, the first conversion signal CSIG1, the second conversion signal CSIG2, and the previously decoded data MSB [n−1] and LSB [n−1]. In some embodiments, the DFE 430 may change the adjustment amount for adjusting the time difference, based on the code of the third calibration signal DFE_TAP CODE and the bit values of previously decoded data MSB [n−1] and LSB [n−1].

The decoder 440 may be configured to determine bit values of the decoded data MSB [n] and LSB [n], based on a first-input signal among the first signal MP and the second signal MN. The calibration circuit 402 may receive the clock signal CK, previously decoded data MSB [n−1] to LSB [n−1], the first signal MP, and the second signal MN. The calibration circuit 402 may output at least one of the first calibration signal V_REF and the second calibration signal VTC_GAIN, based on the clock signal CK, the first signal MP, and the second signal MN. The calibration circuit 402 may output the third calibration signal DFE_TAP CODE, based on the clock signal CK, previously decoded data MSB [n−1] and LSB [n−1], the first signal MP, and the second signal MN. The first calibration signal V_REF and the second calibration signal VTC_GAIN may be analog signals, and the third calibration signal DFE_TAP CODE may be a digital signal. In some embodiments, the calibration circuit 402 may calibrate the DFE tap coefficient of the DFE 430 using a positive signal aligned with the reference timing signal among the first signal MP and the second signal MN.

Figure 5:
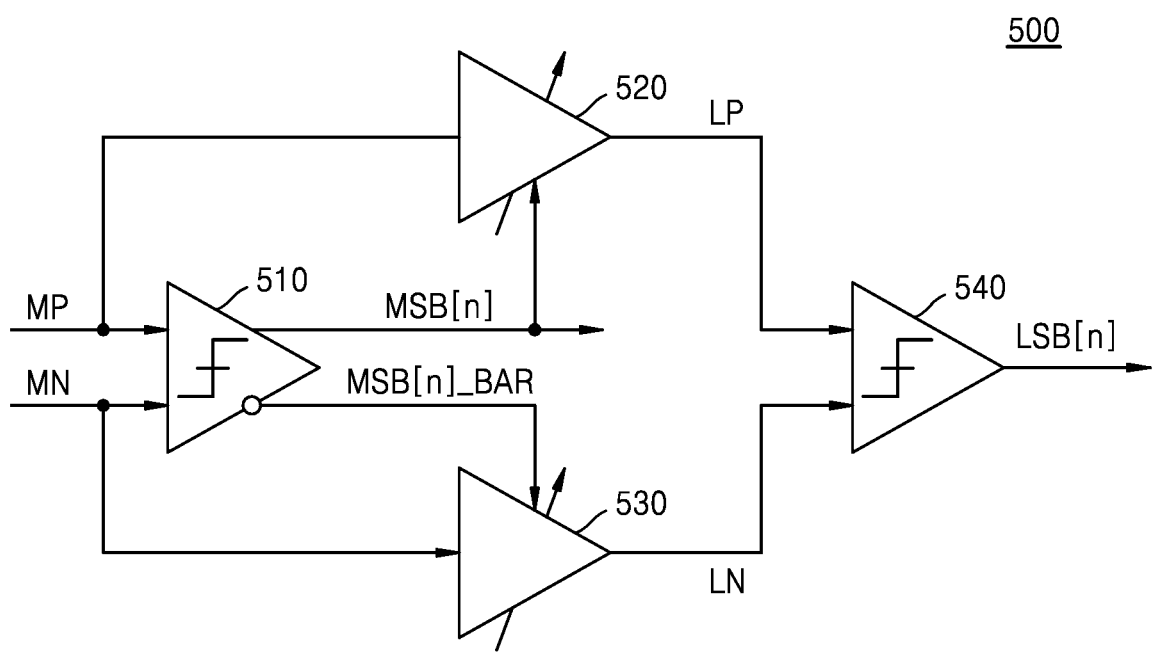
FIG. 5 is a diagram illustrating some embodiments of the decoder of FIG. 4.

FIG. 5 is a diagram illustrating some embodiments of the decoder of FIG. 4. In particular, the decoder 500 of FIG. 5 may include a first time comparator 510, a first delay 520, a second delay 530, and a second time comparison circuit 540. The first time comparator 510 may receive a first signal MP and a second signal MN. The first signal MP and the second signal MN may be sequentially input with a specific time difference therebetween. A time difference between the first signal MP and the second signal MN may correspond to a voltage level difference between the first differential signal DSIG1 and the second differential signal DSIG2. As the voltage level difference increases, the time difference may also increase, and as the voltage level difference decreases, the time difference may also be decrease. The first signal MP may be input to the first delay unit 520 and the second signal MN may be input to the second delay unit 530.

The first time comparator 510 may determine a first bit value depending on a first first-arrived signal among the first signal MP and the second signal MN. In some embodiments, the first bit value may be, for example, a most significant bit (MSB) of the PAM-4 signal. For example, when the first first-arrived signal is the first signal MP, the MSB value may be a first value, and when the first first-arrived signal is the second signal MN, the MSB value may be a second value. For example, the first value may be '1 (=1b)' and the second value may be '0 (=0b)'. However, the first value and the second value are not limited thereto, and the first value may be '0' and the second value may be '1'. The first time comparator 510 may output first data MSB [n] including the currently output MSB. In some embodiments, the first time comparator 510 may output flip data MSB [n] _BAR including a flip bit value obtained by bit flipping a currently output MSB. In other embodiments, the inverter may output the flip data MSB [n] _BAR by inverting the MSB of the first data MSB [n].

Each of the first data MSB [n] and the flip data MSB [n] _BAR may be an enable signal for further delay by the threshold delay time. In FIG. 5, the first data MSB [n] may be input to the first delay unit 520 and flip data MSB [n] _BAR may be input to the second delay unit 530. However, it is not limited thereto, and in other embodiments, the first data MSB [n] may be input to the second delay 530 and the flip data MSB [n] _BAR may be input to the first delay 520. An operation of further delaying by the threshold delay time may be performed depending on the logic value of the enable signal. For example, a delay circuit receiving a first bit value among the first and second delayers 520 and 530 may be enabled. However, the operation of further delaying is not limited thereto.

The first delay 520 may receive the first signal MP and the first data MSB [n], may adjust the amount of delay to delay the first signal MP depending on the bit value of the first data MSB [n], and may output a first delay signal LP obtained by delaying the first signal MP. For example, when the MSB of the first data MSB [n] is the first value, the first signal MP may be delayed by the sum of the reference delay time and the threshold delay time. When the MSB of the first data MSB [n] is the second value, the first signal MP may be delayed by the reference delay time.

The second delay 530 may receive the second signal MN and the flip data MSB [n] _BAR, may adjust the amount of delay to delay the second signal MN depending on the bit value of the flip data MSB [n] _BAR, and may output a second delay signal LN obtained by delaying the second signal MN. For example, when the MSB of the first data MSB [n] is the first value, the bit value of the flip data MSB [n] _BAR is the second value, so the second signal MN may be delayed by the reference delay time. When the MSB of the first data MSB [n] is the second value, the first signal MP may be delayed by the sum of the reference delay time and the threshold delay time.

The second time comparator 540 may receive the first delayed signal LP and the second delayed signal LN. The second time comparator 540 may determine a second bit value depending on a second, first-arrived, signal among the first delayed signal LP and the second delayed signal LN. In some embodiments, when the first bit value is an MSB, the second bit value may be a least significant bit (LSB). For example, when the second first-arrived signal is the first delayed signal LP, the value of the LSB may be the first value, and when the second first-arrived signal is the second delayed signal LN, the value of the LSB may be the second value. The second time comparator 540 may output second data LSB [n] including the currently output LSB.

Figure 6:
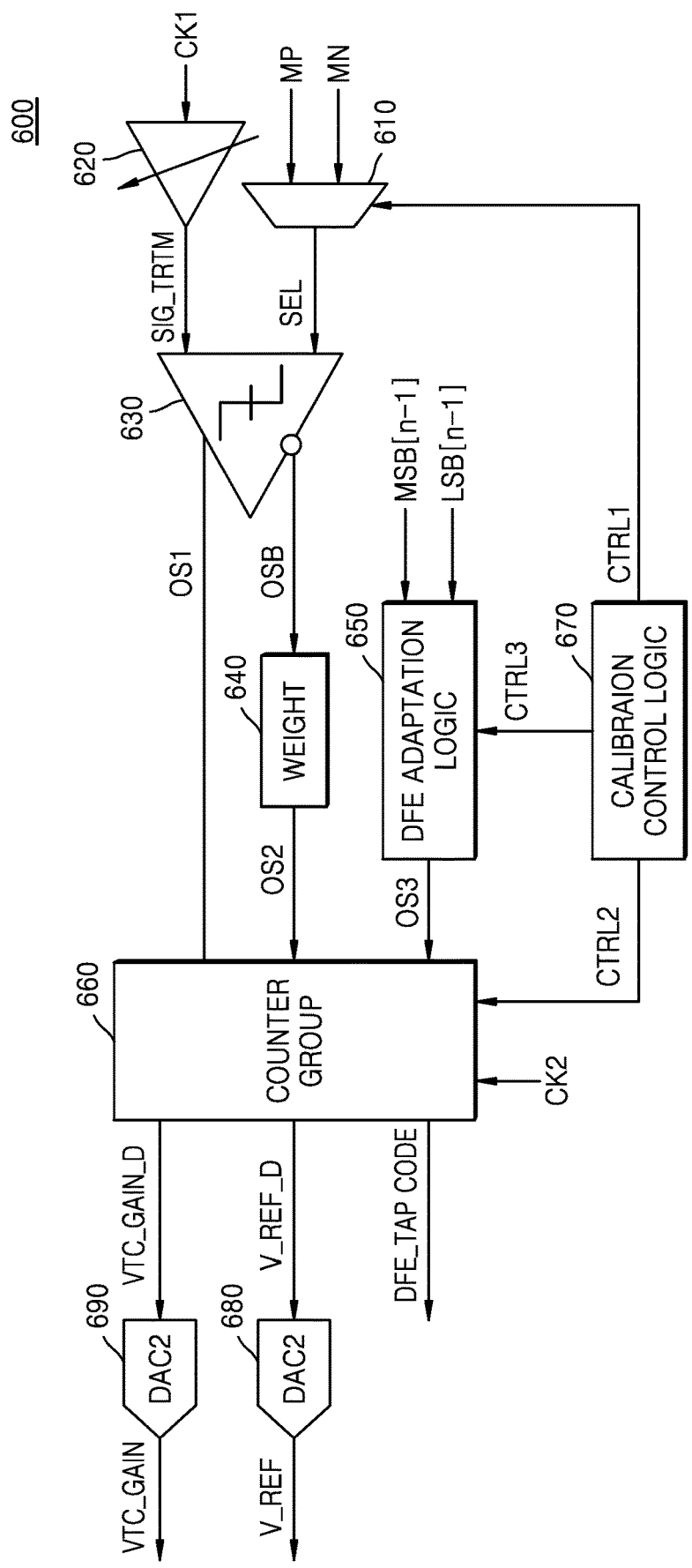
FIG. 6 is a diagram of some embodiments of the calibration circuit of FIG. 4.

FIG. 6 is a diagram of some embodiments of the calibration circuit of FIG. 4. This calibration circuit 600 may include a selector 610, a reference timing signal generator 620, a time comparator 630, a coefficient weight controller 640, and a DFE controller 650, a counter group 660, a calibration control logic 670, a first digital to analog converter (DAC, 680), and a second DAC 690.

The selector 610 may be configured to output a selection signal SEL selected from among a first signal MP and a second signal MN. In some embodiments, the selector 610 may select the first signal MP or the second signal MN depending on the logic level of a first control signal CTRL1. For example, when the logic level of the first control signal CTRL1 is the first logic level, the selector 610 may output the first signal MP as the selection signal SEL. When the logic level of the first control signal CTRL1 is the second logic level, the selector 610 may output the second signal MN as the selection signal SEL. In some embodiments, a positive signal of the first signal MP and the second signal MN may be used to calibrate the voltage time gain and a negative signal of the first signal MP and the second signal MN may be used to calibrate the reference voltage level.

The reference timing signal generator 620 may be configured to generate a reference timing signal SIG_TRTM based on a first clock signal CK1. In some embodiments, the first clock signal CK1 may be the clock signal CK of FIG. 4. The reference timing signal SIG_TRTM may be a signal having reference timing. The reference timing is described below with reference to FIG. 9. The time comparator 630 may be configured to output a first output signal OS1 and an inverted comparison signal OSB based on the selection signal SEL and the reference timing signal SIG_TRTM. The inverted comparison signal OSB may be an inverted signal of the first output signal OS1. The time comparator 630 may determine the logic level of the first output signal OS1 depending on a first-input signal among the selection signal SEL and the reference timing signal SIG_TRTM.

The coefficient weight controller 640 may be configured to receive the inverted comparison signal OSB. Whenever the inverted comparison signal OSB is input as many times as the number of inputs corresponding to an integer ratio, the coefficient weight controller 640 may be configured to output the second output signal OS2. For example, when the integer ratio is 1:4, the number of inputs is 4 times, and in this case, the coefficient weight controller 640 may output the second output signal OS2 whenever the inverted comparison signal OSB is input four times.

The DFE controller 650 may be configured to output a third output signal OS3 based on previously decoded data MSB [n−1] and LSB [n−1]. In some embodiments, the DFE controller 650 may output the third output signal OS3 depending on the logic level of a third control signal CTRL3.

The counter group 660 may output at least one of the first and second digital signals V_REF_D and VTC_GAIN_D and a third calibration signal DFE_TAP CODE, based on the first output signal OS1, the second output signal OS2, and the third output signal OS3. The counter group 660 may include a plurality of counters. The counter group 660 may output at least one signal in response to a second clock signal CK2. In some embodiments, the period of the second clock signal CK2 may be greater than that of the first clock signal CK1. That is, the frequency of the second clock signal CK2 may be less than the frequency of the first clock signal CK1.

The first DAC 670 may convert a first digital signal V_REF_D into a first calibration signal V_REF. The second DAC 680 may convert the second digital signal VTC_GAIN_D into a second calibration signal VTC_GAIN.

Figure 7:
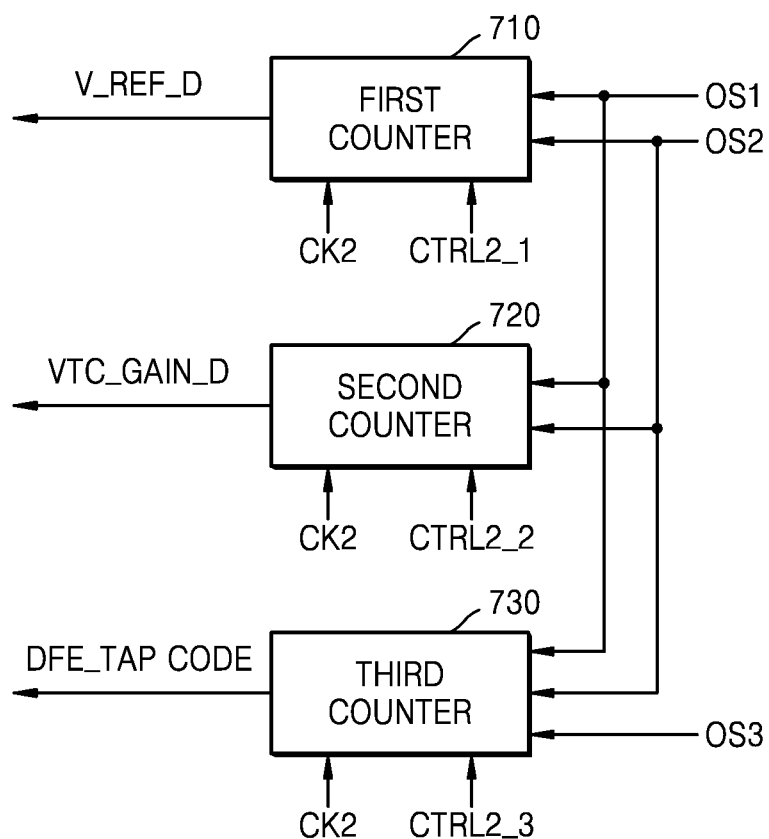
FIG. 7 is a diagram illustrating some embodiments of the counter group of FIG. 4.

FIG. 7 is a diagram illustrating some embodiments of the counter group of FIG. 6. This counter group 700 may include a first counter 710, a second counter 720, and a third counter 730. The first counter 710, the second counter 720, and the third counter 730 may output signals in response to the second clock signal CK2. The first counter 710 may output a first digital signal V_REF_D based on the first output signal OS1 and the second output signal OS2. In some embodiments, the first counter 710 may perform an operation or be idle depending on the logic level of a first sub control signal CTRL2_1.

The second counter 720 may output a second digital signal VTC_GAIN_D based on the first output signal OS1 and the second output signal OS2. In some embodiments, the second counter 720 may perform an operation or be idle depending on the logic level of a second sub control signal CTRL2_2. The third counter 730 may output a third calibration signal DFE_TAP CODE based on the first output signal OS1, the second output signal OS2, and the third output signal OS3. In some embodiments, the third counter 730 may perform an operation or be idle depending on the logic level of a third sub control signal CTRL2_3. The first sub control signal CTRL2_1, the second sub control signal CTRL2_2, and the third sub control signal CTRL2_3 may be included in the second control signal CTRL2 of FIG. 6.

Figure 8:
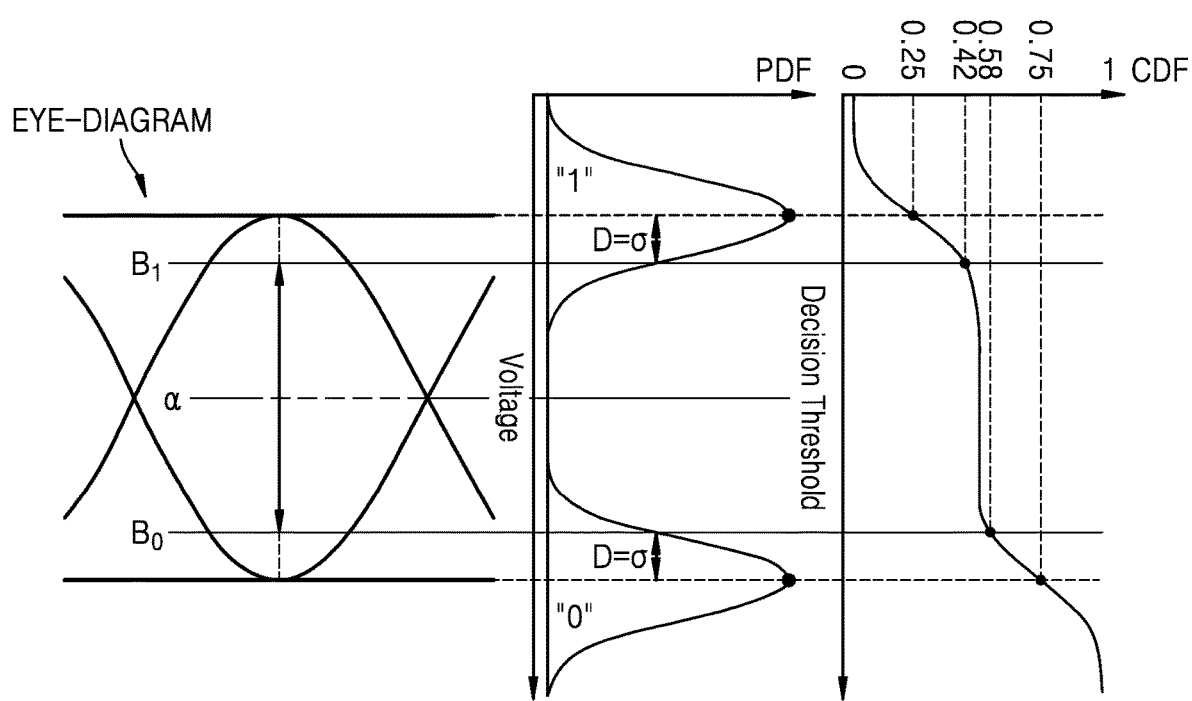
FIG. 8 is a diagram that highlights the probability that a signal input to a receiver is determined to be a specific symbol based on the voltage level of the signal.

FIG. 8 is a diagram illustratively showing the probability that a signal input to a receiver is determined to be a specific symbol based on the voltage level of the signal. The eye diagram EYE-DIAGRAM of FIG. 8 is based on a non-return to zero (NRZ) signal for convenience of description. However, an embodiment of the inventive concept may be applied to an eye diagram based on a PAM-N signal.

Referring to FIG. 8, the probability that the NRZ signal is determined as a specific symbol in the eye diagram EYE-DIAGRAM may vary depending on the voltage level of the NRZ signal. An example of a probability density function (PDF) representing the probability that the symbol of the NRZ signal is '1' and a PDF representing the probability that the symbol of the NRZ signal is '0' are shown in FIG. 8. Each PDF may be distributed in the form of a standard normal distribution. In detail, for example, based on a specific voltage level of the NRZ signal in each PDF, the probability value may decrease as the distance from the specific voltage level increases.

Because the symbol of the NRZ signal is '1' or '0', the total probability (e.g., the area of the PDF) of a PDF representing a probability that a symbol becomes '1' or a PDF representing a probability that a symbol becomes '0' may be 0.5. As shown in "B1" in FIG. 8, when the voltage level of the NRZ signal with the highest probability that the symbol becomes '1' is lowered by 'D', the voltage value for the probability that the symbol becomes '1' in the PDF may be a value spaced apart by 'σ' from the voltage value that has the highest probability that the symbol becomes '1'.

As shown in "B$_0$" in FIG. 8, when the voltage level of the NRZ signal with the highest probability that the symbol becomes '0' increases by 'D', the value of the voltage for the probability that the symbol becomes '0' in the PDF may be a value spaced apart by 'σ' from the value of the voltage that has the highest probability that the symbol becomes '0'. In addition, as shown in "a" in FIG. 8, at an intermediate voltage level between a voltage level corresponding to the highest probability that a symbol becomes '0' and a voltage level corresponding to the highest probability that a symbol becomes '1', the probability of the intermediate voltage level may be zero. A cumulative distribution function (CDF) of the NRZ signal may represent a distribution obtained by cumulatively summing a PDF representing a probability that a symbol becomes '1' and a PDF representing a probability that a symbol becomes '0'. An example of the CDF of the NRZ signal may be shown as shown in FIG. 8.

Figure 9:
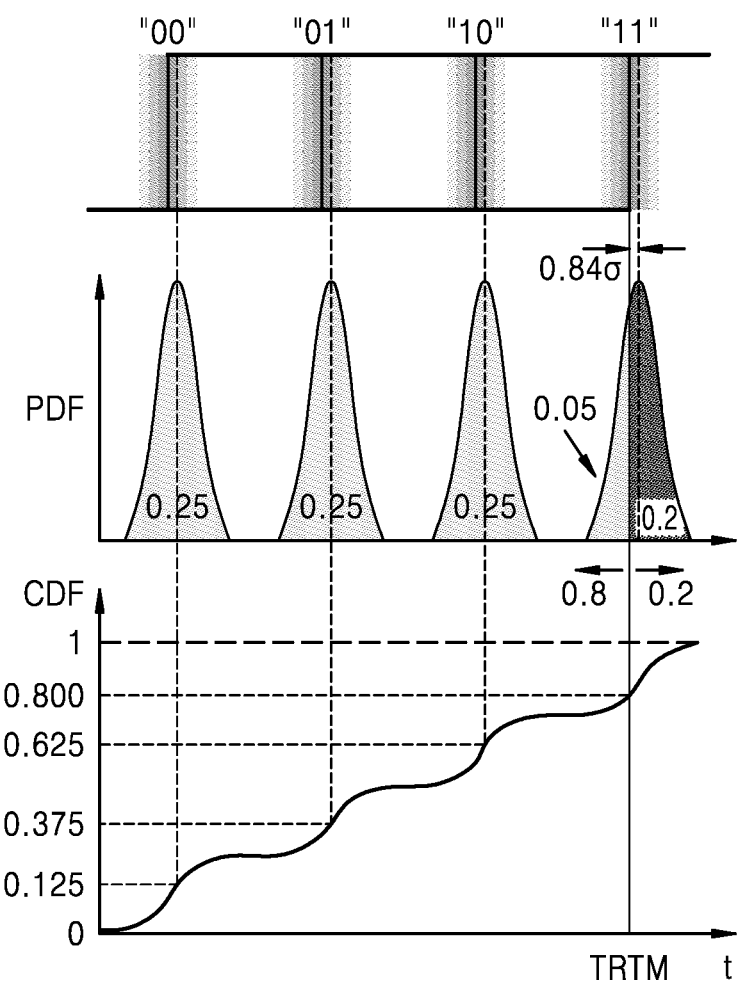
FIG. 9 is a diagram that illustrates a probability that a PAM-4 signal input to a time-based receiver is determined to be a specific symbol based on edge timing.

FIG. 9 is a diagram illustratively illustrating a probability that a PAM-4 signal input to a time-based receiver is determined to be a specific symbol based on edge timing; FIG. 9 is shown based on the PAM-4 signal for convenience of explanation. Referring to FIGS. 1, 2A, 2B, 8, and 9, as described above with reference to FIGS. 2A and 2B, the PAM-4 signal may be changed into a signal having an edge occurring at a specific edge timing by the time-based receiver 130. As described above with reference to FIG. 8, because the symbol of the PAM-4 signal converted on a time basis is '00', '01', '10', or '11', the probability that the symbol of the PAM-4 signal is '00', '01', '10', or '11' may be 0.25 as the total probability of the PDF (e.g., the area of the PDF). An example of the CDF of the PAM-4 signal may be shown as shown in FIG. 9.

In the PAM-4 signal, the reference symbol may be, for example, '11'. However, the reference symbol is not limited thereto. Based on the movement axis spaced by a certain shift amount from the PDF axis passing through the peak value of the PDF corresponding to the highest probability that the PAM-4 signal may be the reference symbol, that is, '11', the first PDF area and the second PDF area may be distinguished from each other. The shift amount may be, for example, 0.84σ. In this case, a first PDF area may be an area of a PDF corresponding to '11' having an edge timing greater than the edge timing of the movement axis. A second PDF area may be an area of a PDF having an edge timing less than the edge timing of the movement axis. For example, the second PDF area may include an area of the PDF corresponding to '00', an area of the PDF corresponding to '01', an area of the PDF corresponding to '10', and a partial area of the PDF corresponding to '11'. The first PDF area and the second PDF area represent probabilities, and based on the shift amount of 0.84σ, the ratio of the first PDF area to the second PDF area may be 0.2:0.8. The shift amount may be determined to be 0.84σ so that the first probability to the second probability is set at a ratio of 1:4. In this case, a reference timing (TRTM) may be set so that the ratio of the first probability to the second probability is 1:4. However, it is not limited thereto, and a shift amount and a reference timing TRTM may be determined to set the first probability and the second probability as an integer ratio. That is, as shown in the example of FIG. 9, when the edge timing corresponding to a part spaced by 0.84σ from the center of the "11" symbol of the PAM-4 signal is set to the reference timing TRTM, the ratio of each PDF area is 1:4, so the calibration circuit 401 may calibrate parameters by comparing the reference timing signal SIG_TRTM with the first and second signals MP and MN using this characteristic.

FIGS. 10A, 10B, 10C, 10D, 10E, and 10F are views for explaining embodiments of calibrating parameter values. In FIGS. 10A, 10B, 10C, 10D, 10E, and 10F, examples of graphs in which the horizontal axis represents the voltage level Tx[V] of the transmission signal and the vertical axis represents the delay time Delay[s] are shown. Also, examples of a graph in which the horizontal axis represents cycles and the vertical axis represents time difference MP-MN [ps] are shown.

Figure 10A:
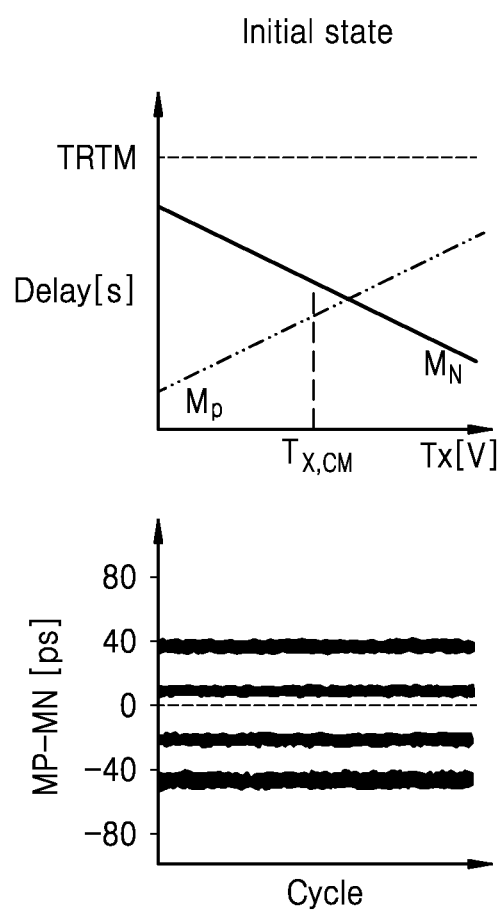
FIGS. 10A, 10B, 10C, 10D, 10E, and 10F are views for explaining embodiments of calibrating parameter values.

The embodiment shown in FIG. 10A shows an initial state of the receiver 130 as an example. Referring to FIG. 10A, the delay time of the first signal MP may increase as the voltage level Tx[V] of the transmission signal increases. The delay time of the second signal MN may decrease as the voltage level Tx[V] of the transmission signal increases. The delay time of the first signal MP and the delay time of the second signal MN may be different from each other based on the common mode transmission signal Tx,cm. Accordingly, graph lines representing the time difference between the first signal MP and the second signal MN may be displayed closer to '0 [ps]' compared to FIG. 10E.

Figure 10B:
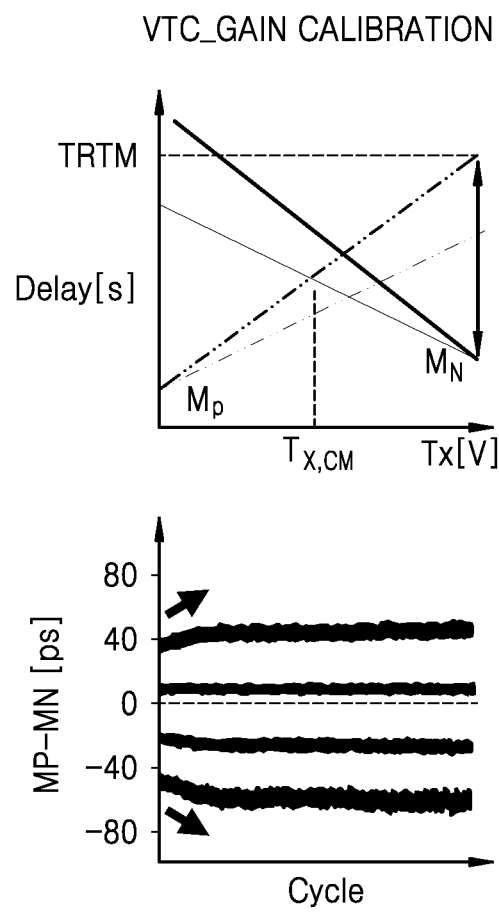

The embodiment shown in FIG. 10B shows an example of cycles for calibrating the voltage time gain (VTC_GAIN). Referring to FIG. 10B, as the voltage time gain is calibrated based on the positive first signal MP and the reference timing TRTM, the slope of the delay time of the first signal MP with respect to the voltage level Tx[V] of the transmission signal may increase. Also, the slope of the delay time of the second signal MN with respect to the voltage level Tx[V] of the transmission signal may decrease. That is, the absolute value of the slope of the delay time of the second signal MN may increase. The interval between the graph lines representing the time difference between the first signal MP and the second signal MN may be maintained after being spaced until the cycle progresses to a certain extent.

Figure 10C:
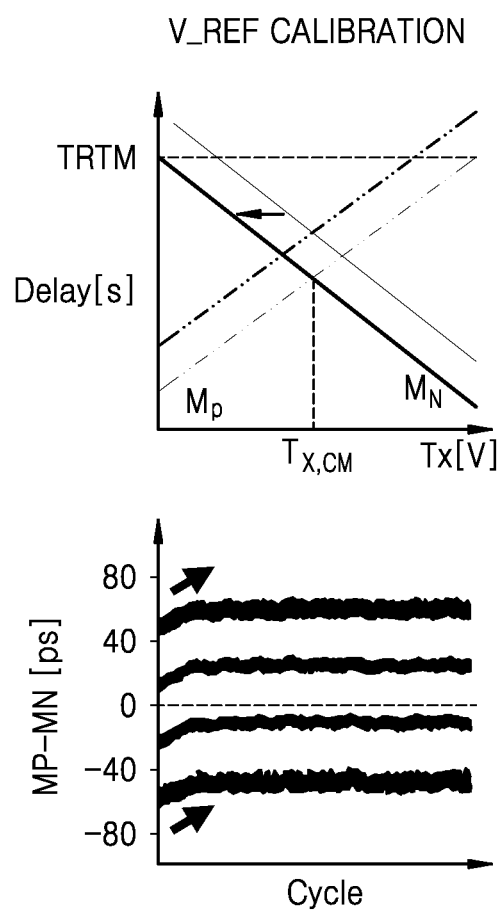

The embodiment shown in FIG. 10C illustratively shows cycles for calibrating the reference voltage level (V_REF). Referring to FIG. 10C, as the reference voltage level is calibrated based on the negative second signal MN and the reference timing TRTM, a graph representing the delay time of the first signal MP with respect to the voltage level Tx[V] of the transmission signal may be translated in parallel as shown in FIG. 10C. Also, a graph representing the delay time of the second signal MN with respect to the voltage level Tx[V] of the transmission signal may be moved in parallel as shown in FIG. 10C. In the graph lines representing the time difference between the first signal MP and the second signal MN, the time difference may increase overall as the cycle progresses, and then the time difference may be maintained at a constant value.

Figure 10D:
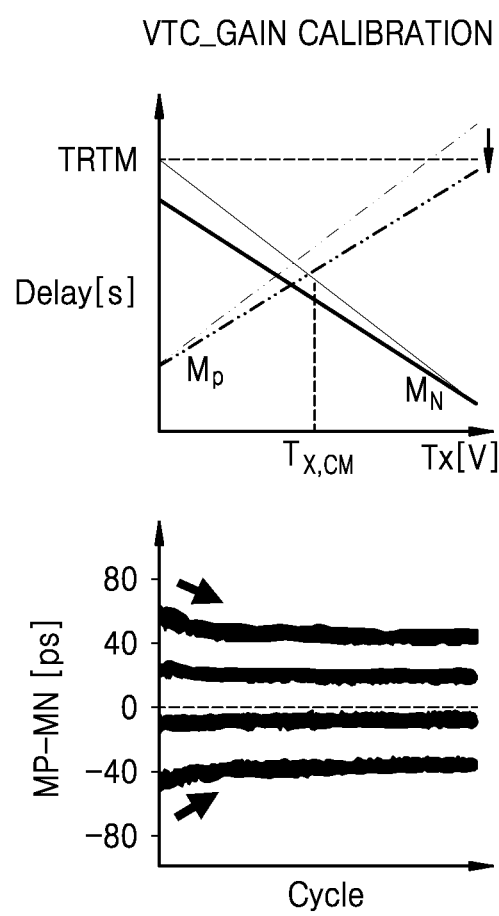

The embodiment shown in FIG. 10D illustratively illustrates cycles of calibrating the voltage time gain (VTC_GAIN). Referring to FIG. 10D, as the voltage time gain is calibrated based on the positive first signal MP and the reference timing TRTM, the slope of the delay time of the first signal MP with respect to the voltage level Tx[V] of the transmission signal may decrease. Also, the slope of the delay time of the second signal MN with respect to the voltage level Tx[V] of the transmission signal may increase. That is, the absolute value of the slope of the delay time of the second signal MN may decrease. The distance between the graph lines representing the time difference between the first signal MP and the second signal MN may be maintained after being close to each other until the cycle progresses to a certain extent.

Figure 10E:
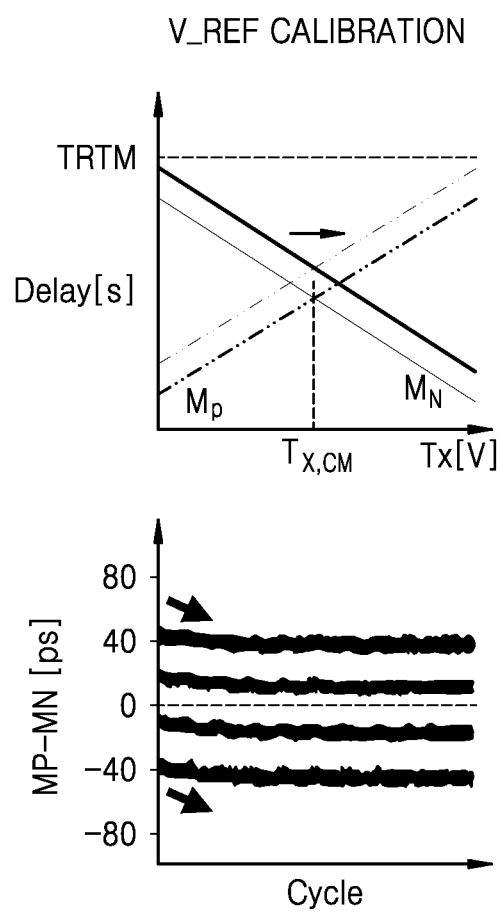

The embodiment shown in FIG. 10E illustratively shows cycles of calibrating the reference voltage level (V_REF). Referring to FIG. 10E, as the reference voltage level is calibrated based on the negative second signal MN and the reference timing TRTM, a graph showing the delay time of the first signal MP with respect to the voltage level Tx[V] of the transmission signal may be translated in parallel as shown in FIG. 10E. Also, a graph representing the delay time of the second signal MN with respect to the voltage level Tx[V] of the transmission signal may be moved in parallel as shown in FIG. 10E. In the graph lines representing the time difference between the first signal MP and the second signal MN, the time difference may decrease as a whole as the cycle progresses, and then the time difference may be maintained at a constant value.

In some embodiments, voltage time gain and reference voltage level may be calibrated alternately. Referring to FIGS. 10B, 10C, 10D, and 10E, for example, after the voltage time gain is calibrated as shown in FIG. 10B, the voltage time gain may be calibrated as shown in FIG. 10C, then the voltage time gain is calibrated as shown in FIG. 10D, and finally the voltage time gain may be calibrated as shown in FIG. 10E. However, the calibration sequence is not limited to the above. In other embodiments, because voltage time gain and reference voltage level may occur simultaneously, the voltage time gain and the reference voltage level may be repeatedly and simultaneously calibrated.

Figure 10F:
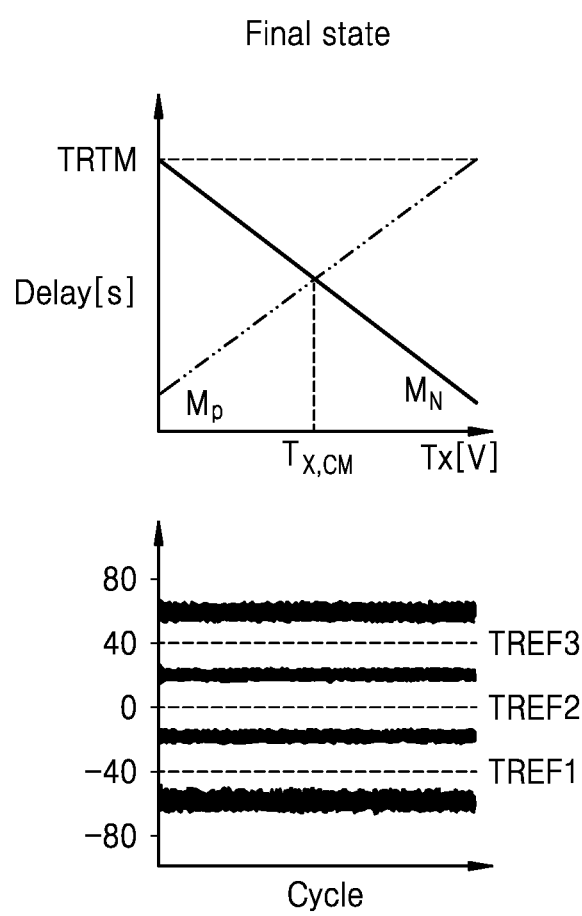

The embodiment shown in FIG. 10F illustratively shows the final state of the receiver 130 after calibration of the voltage time gain and reference voltage level is completed. When calibrating the voltage time gain, the first signal MP may be aligned with the reference timing signal SIG_TRTM. When calibrating the reference voltage level, the second signal MN may be aligned with the reference timing signal SIG_TRTM. A delay time of the first signal MP in the common mode transmission signal Tx,cm may be the same as that of the second signal MN. Accordingly, graph lines representing the time difference between the first signal MP and the second signal MN may be sufficiently spaced from the first to third reference times TREF1, TREF2, and TREF3 of FIGS. 2B and 10E. Accordingly, there is an effect of accurately decoding the transmission signal, the reception signal, or the data signal DQ.

Figure 11:
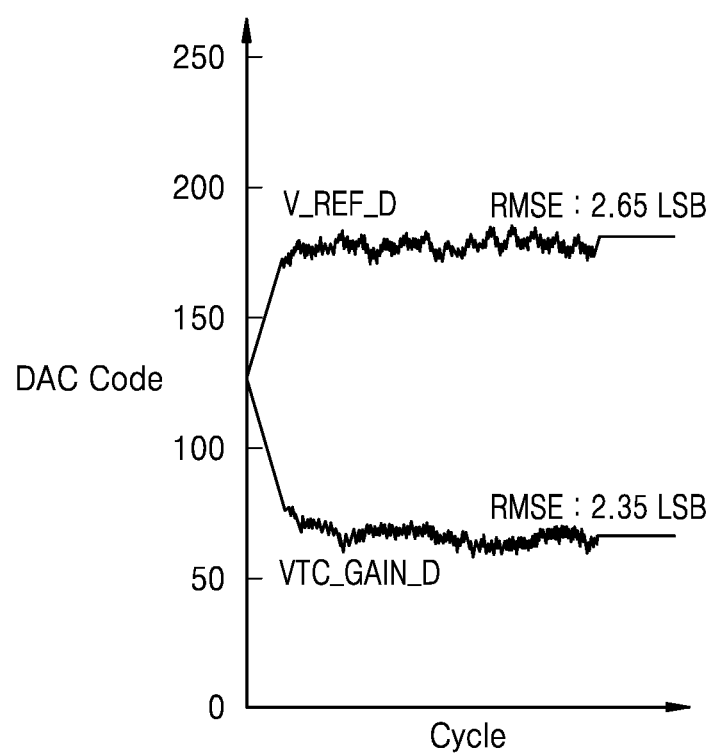
FIG. 11 is a diagram illustrating an example of a first digital signal and a second digital signal based on cycles.

In some embodiments, the logic to calibrate the DFE tap coefficients may be the same as the calibration logic for the voltage time gain and reference voltage level. For example, the delay time (or edge timing, timing) corresponding to symbol '11' may be aligned with the reference timing TRTM through the voltage time gain and calibration logic for the reference voltage level. Then, the calibration circuit 401 detects the transition from symbol '00' to symbol '11', and compares the edge timing at the transition with the reference timing TRTM to determine whether under-equalization or over-equalization has occurred. The calibration circuit 401 may set the MSB coefficient to twice the LSB coefficient in the DFE tap coefficient.

is a diagram illustrating an example of a first digital signal and a second digital signal based on cycles. Referring to FIGS. 6 and 11, a first digital signal V_REF_D may include a reference voltage level code. A second digital signal VTC_GAIN_D may include a voltage time gain code. As certain cycles progress, the reference voltage level code of the first digital signal V_REF_D gradually may increase and the voltage time gain code of the second digital signal VTC_GAIN_D may gradually decrease. After certain cycles, codes of the first digital signal V_REF_D and the second digital signal VTC_GAIN_D may be substantially constant or converge to a specific value. The root mean squared error (RMSE) for the reference voltage level code of the first digital signal V_REF_D may be about 2.65 LSB, and the RMSE of the voltage time gain code of the second digital signal VTC_GAIN_D may be about 2.35 LSB. As described above, there is an effect of implementing a time-based receiver that is insensitive to environmental changes.

Figure 12:
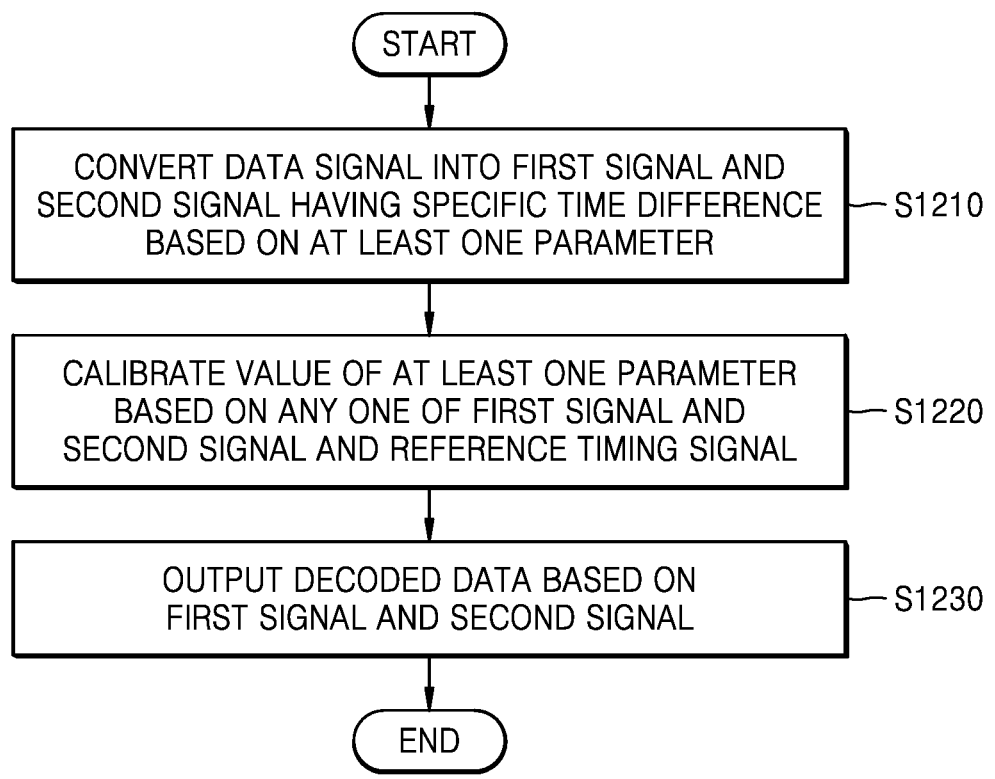
FIG. 12 is a flowchart illustrating a method of operating a receiver, according to embodiments.

FIG. 12 is a flowchart illustrating a method of operating a receiver, according to embodiments. Referring to FIG. 12, operations S1210, S1220, and S1230 may be performed by the receiver 130. In operation S1210, the converting of the data signal DQ into a first signal MP and a second signal MN having a specific time difference based on at least one parameter is performed. Then, in operation S1220, calibrating the value of at least one parameter based on any one of the first signal MP and the second signal MN and a reference timing signal SIG_TRTM is performed. The reference timing signal SIG_TRTM may be a signal having reference timing TRTM. The reference timing TRTM may be set such that a ratio between a first probability and a second probability is an integer ratio. The first probability may be a probability that decoded data is decoded as a reference symbol among a plurality of symbols. The second probability may be a probability that decoded data is decoded into any one symbol among the remaining symbols other than the reference symbol in the plurality of symbols. Referring to FIG. 9, for example, the reference timing TRTM may be set such that the reference symbol is '11' and the ratio of the first probability and the second probability is '0.2:0.8 (=1:4)'. Finally, in operation S1230, the decoded data based on the first signal and the second signal is output.

Figure 13:
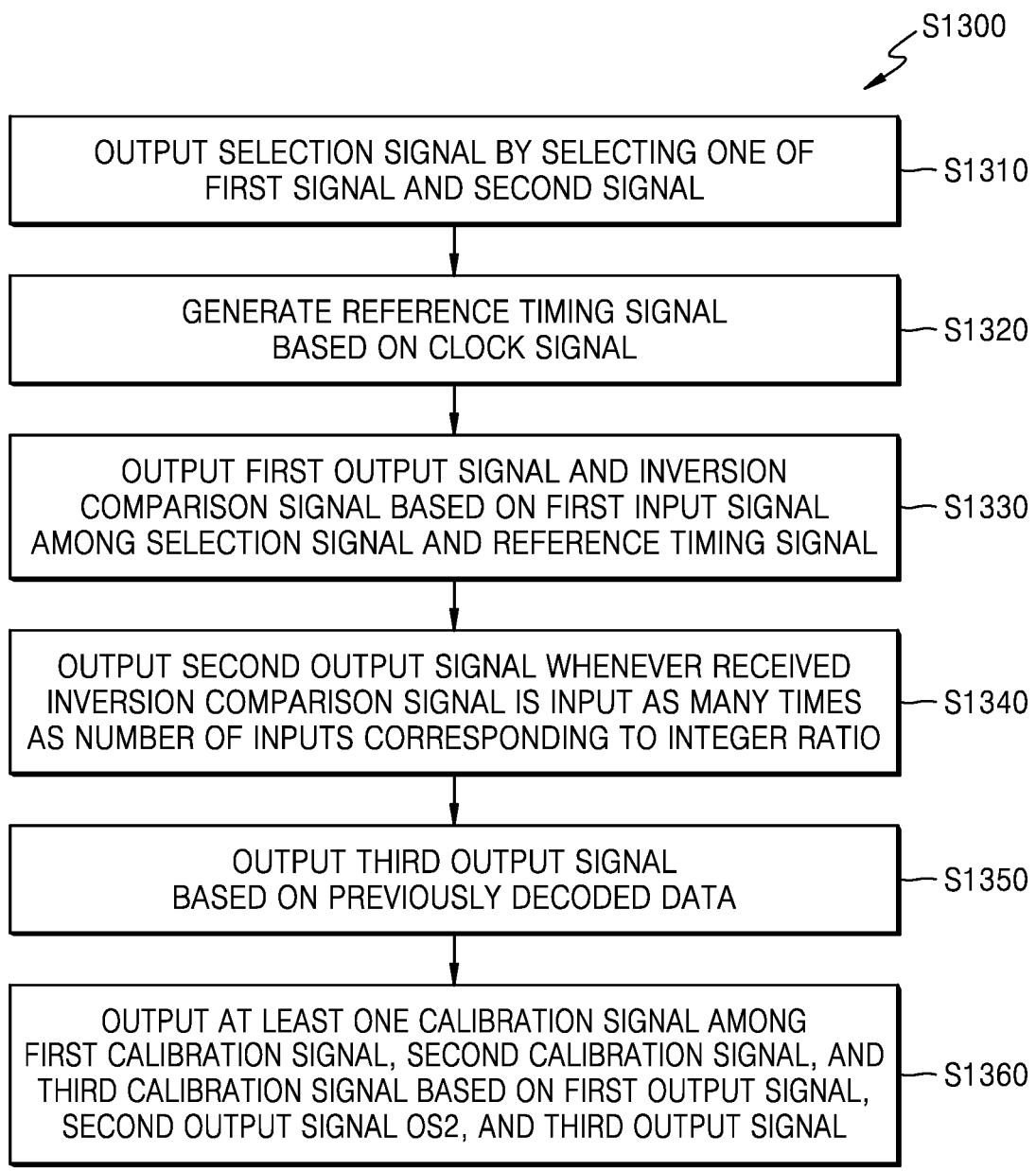
FIG. 13 is a flowchart for describing some embodiments of calibrating the value of a parameter.

FIG. 13 is a flowchart for describing some embodiments of calibrating the value of a parameter. Referring to FIG. 13, operation S1300 of calibrating the value of the parameter may correspond to operation S1220 of FIG. 11. Operation S1300 of calibrating the value of the parameter may be performed by the calibration circuit 600 of FIG. 6. Next, in operation S1310, an outputting of the selection signal SEL by selecting one of the first signal MP and the second signal MN is performed. Operation S1310 may be performed by the selector 610 of FIG. 6. Then, in operation S1320, an operation of generating a reference timing signal SIG_TRTM based on the clock signal CK is performed; this operation S1320 may be performed by the reference timing signal generator 620 of FIG. 6.

Then, in operation S1330, an operation of outputting the first output signal OS1 and the inversion comparison signal OSB based on the first input signal among the selection signal SEL and the reference timing signal SIG_TRTM is performed. The inversion comparison signal OSB may be an inverted signal of the first output signal OS1; operation S1330 may be performed by the time comparator 630 of FIG. 6.

In operation S1340, the second output signal OS2 is output whenever the received inversion comparison signal OSB is input as many times as the number of inputs corresponding to the integer ratio. Operation S1340 may be performed by the coefficient weight controller 640 of FIG. 6. In operation S1350, the third output signal OS3 is output based on the previously decoded data MSB [n−1] and LSB [n−1]; operation S1350 may be performed by the time comparator 630 of FIG. 6.

In operation S1360, at least one calibration signal among the first calibration signal V_REF, the second calibration signal VTC_GAIN, and the third calibration signal DFE_TAP CODE is output based on the first output signal OS1, the second output signal OS2, and the third output signal OS3; operation S1350 may be performed by the counter group 660 of FIG. 6.

Figure 14:
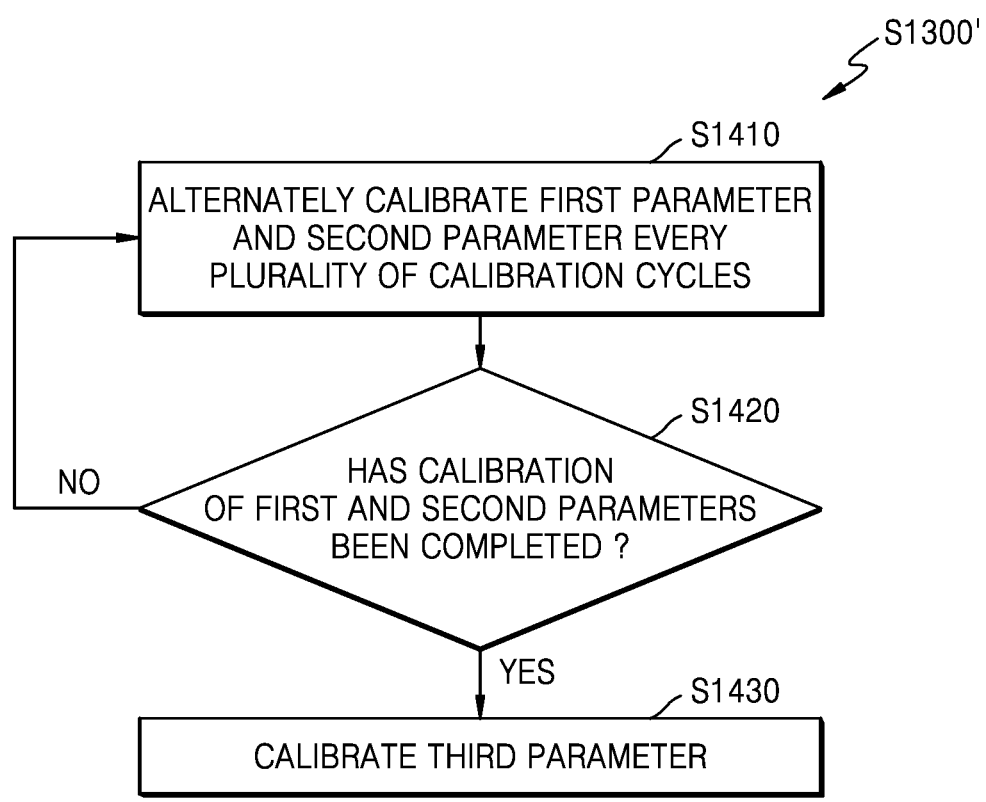
FIG. 14 is a flowchart for explaining some other embodiments of an operation of calibrating a value of a parameter.

FIG. 14 is a flowchart for explaining additional embodiments of an operation of calibrating a value of a parameter. Referring to FIG. 14, operation S1300' of calibrating the value of the parameter may correspond to operation S1220 shown in FIG. 11, and may be performed by the calibration circuit 402 of FIG. 4. In operation S1300' shown in FIG. 14, the at least one parameter may include a first parameter representing a reference voltage level, a second parameter representing a voltage time gain, and a third parameter representing a code for adjusting a DFE tap coefficient.

In operation S1410, the first parameter and the second parameter are alternately calibrated every plurality of calibration cycles. In operation S1420, whether calibration of the first and second parameters is completed is checked. And, when calibration of the first and second parameters is not completed (No in operation S1420), operation S1410 is performed. However, when the calibration of the first and second parameters is completed (Yes in operation S1420), after completing the calibration of each of the first and second parameters through a plurality of calibration cycles, in operation S1430, the third parameter is calibrated.

Figure 15:
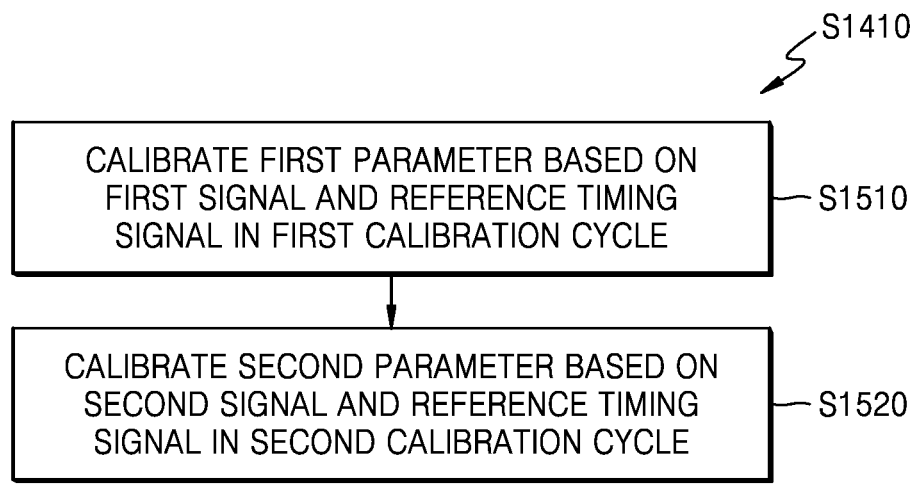
FIG. 15 is a flowchart for explaining some embodiments of operation S1410 of FIG. 14.

FIG. 15 is a flowchart for explaining some embodiments of operation S1410 of FIG. 14. Referring to FIG. 15, operation S1410 may include operations S1510 and S1520. In operation S1510, an operation of calibrating a first parameter based on the first signal MP and the reference timing signal SIG_TRTM is performed in a first calibration cycle. In some embodiments of operation S1510, the polarity of the first signal MP may be negative or the first signal MP may be a negative signal.

In operation S1520, the second parameter based on the second signal MN and the reference timing signal SIG_TRTM is calibrated in a second calibration cycle after the first calibration cycle. In some embodiments of operation S1510, the polarity of the second signal MN may be positive or the second signal MN may be a positive signal.

Figure 16:
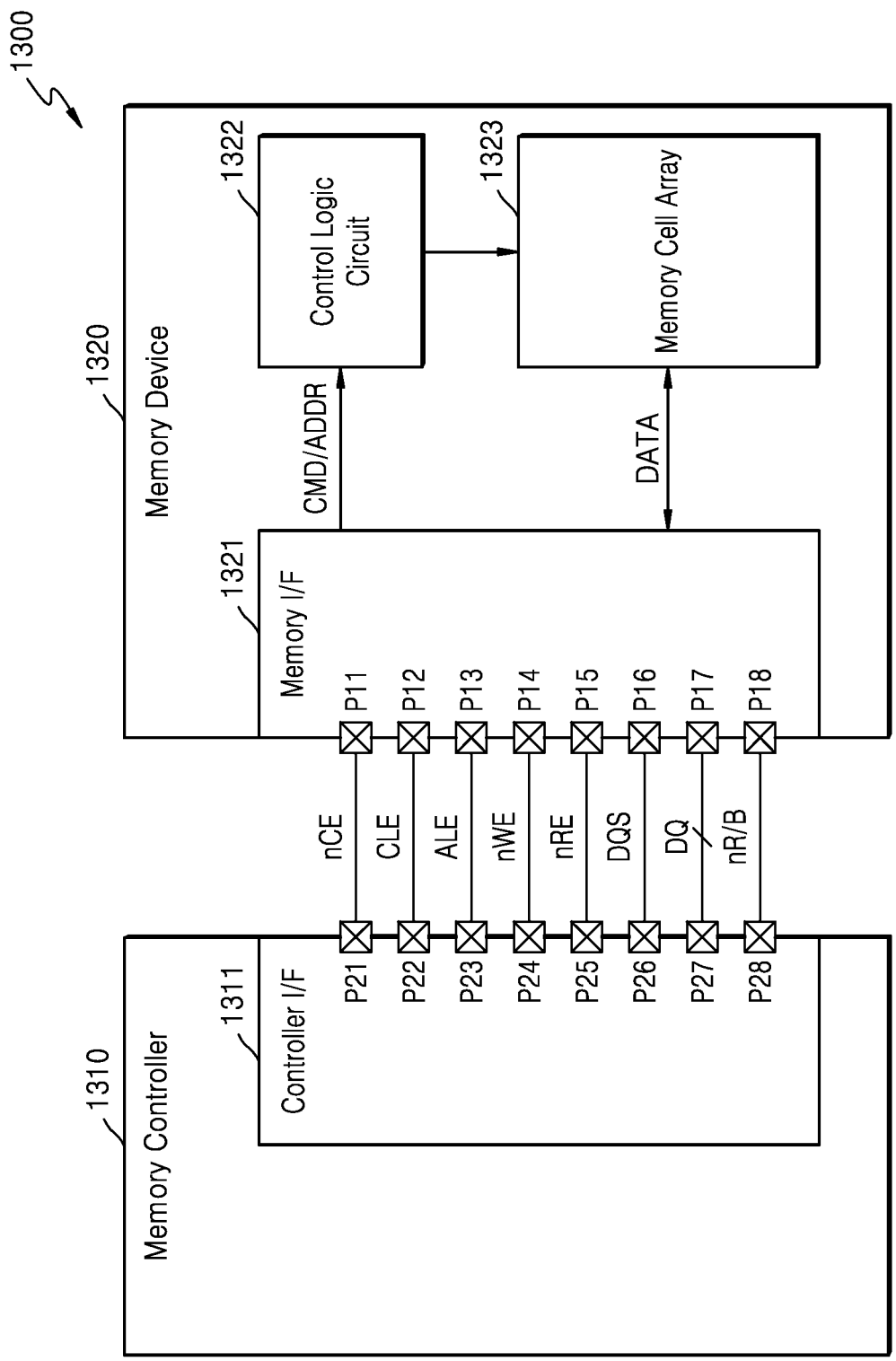
FIG. 16 is a block diagram illustrating a memory system according to embodiments.

FIG. 16 is a block diagram illustrating a memory system according to embodiments. Referring to FIG. 16, a memory system 1300 may include a memory controller 1310 and a memory device 1320. The memory device 1320 may include first to eighth pins P11 to P18, a memory interface circuit 1321, a control logic circuit 1322, and a memory cell array 1323.

The memory interface circuit 1321 may receive a chip enable signal nCE from the memory controller 1310 through the first pin P11. The memory interface circuit 1321 may transmit and receive signals to and from the memory controller 1310 through the second to eighth pins P12 to P18 depending on the chip enable signal nCE. For example, when the chip enable signal nCE is in an enabled state (e.g., low level), the memory interface circuit 1321 may transmit and receive signals to and from the memory controller 1310 through the second to eighth pins P12 to P18. In addition, the memory interface circuit 1321 may receive a command latch enable signal CLE, an address latch enable signal ALE, and a write enable signal nWE from the memory controller 1310 through the second to fourth pins P12 to P14. The memory interface circuit 1321 may receive the data signal DQ from the memory controller 1310 or transmit the data signal DQ to the memory controller 1310 through the seventh pin P17. Command CMD, address ADDR, and data DATA may be transferred through the data signal DQ. For example, the data signal DQ may be transferred through a plurality of signal lines. In this case, the seventh pin P17 may include a plurality of pins corresponding to a plurality of data input/output signals.

The memory interface circuit 1321 may obtain the command CMD from the data signal DQ received during the enable period (e.g., high level state) of the command latch enable signal CLE based on the toggle timings of the write enable signal nWE. The memory interface circuit 1321 may obtain the address ADDR from the data signal DQ received during the enable period (e.g., high level state) of the address latch enable signal ALE based on the toggle timings of the write enable signal nWE.

In an embodiment, the write enable signal nWE may toggle between a high level and a low level while maintaining a toggle off state (e.g., a high level or a low level). For example, the write enable signal nWE may toggle during a period in which the command CMD or address ADDR is transmitted. Accordingly, the memory interface circuit 1321 may obtain the command CMD or address ADDR based on the toggle timings of the write enable signal nWE.

The memory interface circuit 1321 may receive the read enable signal nRE from the memory controller 1310 through the fifth pin P15. The memory interface circuit 1321 may receive the data strobe signal DQS from the memory controller 1310 through the sixth pin P16 or transmit the data strobe signal DQS to the memory controller 1310. During the data output operation of the memory device 1320, the memory interface circuit 1321 may receive the toggling read enable signal nRE through the fifth pin P15 before outputting the data DATA. The memory interface circuit 1321 may generate a data strobe signal DQS that toggles in response to toggling of the read enable signal nRE. The memory interface circuit 1321 may transmit the data signal DQ including the data DATA based on the toggle timing of the data strobe signal DQS. Accordingly, the data DATA may be transmitted to the memory controller 1310 in alignment with the toggle timing of the data strobe signal DQS.

In a data input operation of the memory device 1320, when a data signal DQ including data DATA is received from the memory controller 1310, the memory interface circuit 1321 may receive a data strobe signal DQS that toggles along with the data DATA from the memory controller 1310. The memory interface circuit 1321 may obtain data DATA from the data signal DQ based on the toggle timing of the data strobe signal DQS. For example, the memory interface circuit 1321 may obtain the data DATA by sampling the data signal DQ at the rising edge and the falling edge of the data strobe signal DQS.

The memory interface circuit 1321 may transmit a ready/busy output signal nR/B to the memory controller 1310 through the eighth pin P18. The memory interface circuit 1321 may transmit state information of the memory device 1320 to the memory controller 1310 through the ready/busy output signal nR/B. When the memory device 1320 is busy (i.e., when internal operations of the memory device 1320 are being performed), the memory interface circuit 1321 may transmit a ready/busy output signal nR/B indicating a busy state to the memory controller 1310. In contrast, when the memory device 1320 is in the ready state (i.e., when internal operations of the memory device 1320 are not performed or have completed), the memory interface circuit 1321 may transmit a ready/busy output signal nR/B indicating a ready state to the memory controller 1310.

In some embodiments, the memory interface circuit 1321 may include a decoding circuit 401 and a calibration circuit 402. The control logic circuit 1322 may generally control various operations of the memory device 1320. The control logic circuit 1322 may perform a control operation based on the data signal DQ provided from the memory interface circuit 1321. The control logic circuit 1322 may generate control signals for controlling other elements of the memory device 1320 based on a command and/or an address CMD/ADDR obtained from the memory interface circuit 1321. For example, the control logic circuit 1322 may generate various control signals for programming data DATA into the memory cell array 1323 or reading data DATA from the memory cell array 1323.

The memory cell array 1323 may store data DATA obtained from the memory interface circuit 1321 under the control of the control logic circuit 1322. The memory cell array 1323 may output stored data DATA to the memory interface circuit 1321 under the control of the control logic circuit 1322. The memory cell array 1323 may include a plurality of memory cells. For example, the plurality of memory cells may be a resistive random access memory (RRAM) cell, a ferroelectric random access memory (FRAM) cell, a phase change random access memory (PRAM) cell, a thyristor random access memory (TRAM) cell, a magnetic random access memory (MRAM) cell, a dynamic random access memory (DRAM) cell, a flash memory cell, and the like.

The memory controller 1310 may include first to eighth pins P21 to P28 and a controller interface circuit 1311. The first to eighth pins P21 to P28 may correspond to the first to eighth pins P11 to P18 of the memory device 1320. The controller interface circuit 1311 may transmit the chip enable signal nCE to the memory device 1320 through the first pin P21. The controller interface circuit 1311 may transmit/receive signals with the memory device 1320 selected through the chip enable signal nCE through second to eighth pins P22 to P28.

The controller interface circuit 1311 transmits the command latch enable signal CLE, the address latch enable signal ALE, and the write enable signal nWE to a memory device 1320 through second to fourth pins P22 to P24. The controller interface circuit 1311 may transmit the data signal DQ to the memory device 1320 or receive the data signal DQ from the memory device 1320 through the seventh pin P27.

The controller interface circuit 1311 may transmit the data signal DQ including the command CMD or address ADDR to the memory device 1320 together with the toggling write enable signal nWE. The controller interface circuit 1311 may transmit the data signal DQ including the command CMD to the memory device 1320 as the command latch enable signal CLE in the enabled state is transmitted, and may transmit the data signal DQ including the address ADDR to the memory device 1320 as the address latch enable signal ALE in the enabled state is transmitted.

The controller interface circuit 1311 may transmit the read enable signal nRE to the memory device 1320 through the fifth pin P25. The controller interface circuit 1311 may receive the data strobe signal DQS from the memory device 1320 through the sixth pin P26 or transmit the data strobe signal DQS to the memory device 1320.

In a data output operation of the memory device 1320, the controller interface circuit 1311 may generate a toggling read enable signal nRE and transmit the read enable signal nRE to the memory device 1320. For example, the controller interface circuit 1311 may generate a read enable signal nRE that changes from a toggle off state (e.g., high level or low level) to a toggle state before data DATA is output. Accordingly, the memory device 1320 may generate a data strobe signal DQS that toggles in response to the read enable signal nRE. The controller interface circuit 1311 may receive the toggling data strobe signal DQS and the data signal DQ including the data DATA from the memory device 1320. The controller interface circuit 1311 may obtain data DATA from the data signal DQ based on the toggle timing of the data strobe signal DQS.

In a data input operation of the memory device 1320, the controller interface circuit 1311 may generate a toggling data strobe signal DQS. For example, the controller interface circuit 1311 may generate a data strobe signal DQS that changes from a toggle off state (e.g., high level or low level) to a toggle state before transmitting data DATA. The controller interface circuit 1311 may transmit the data signal DQ including the data DATA to the memory device 1320 based on the toggle timings of the data strobe signal DQS. The controller interface circuit 1311 may receive the ready/busy output signal nR/B from the memory device 1320 through the eighth pin P28. The controller interface circuit 1311 may determine state information of the memory device 1320 based on the ready/busy output signal nR/B.

Figure 17:
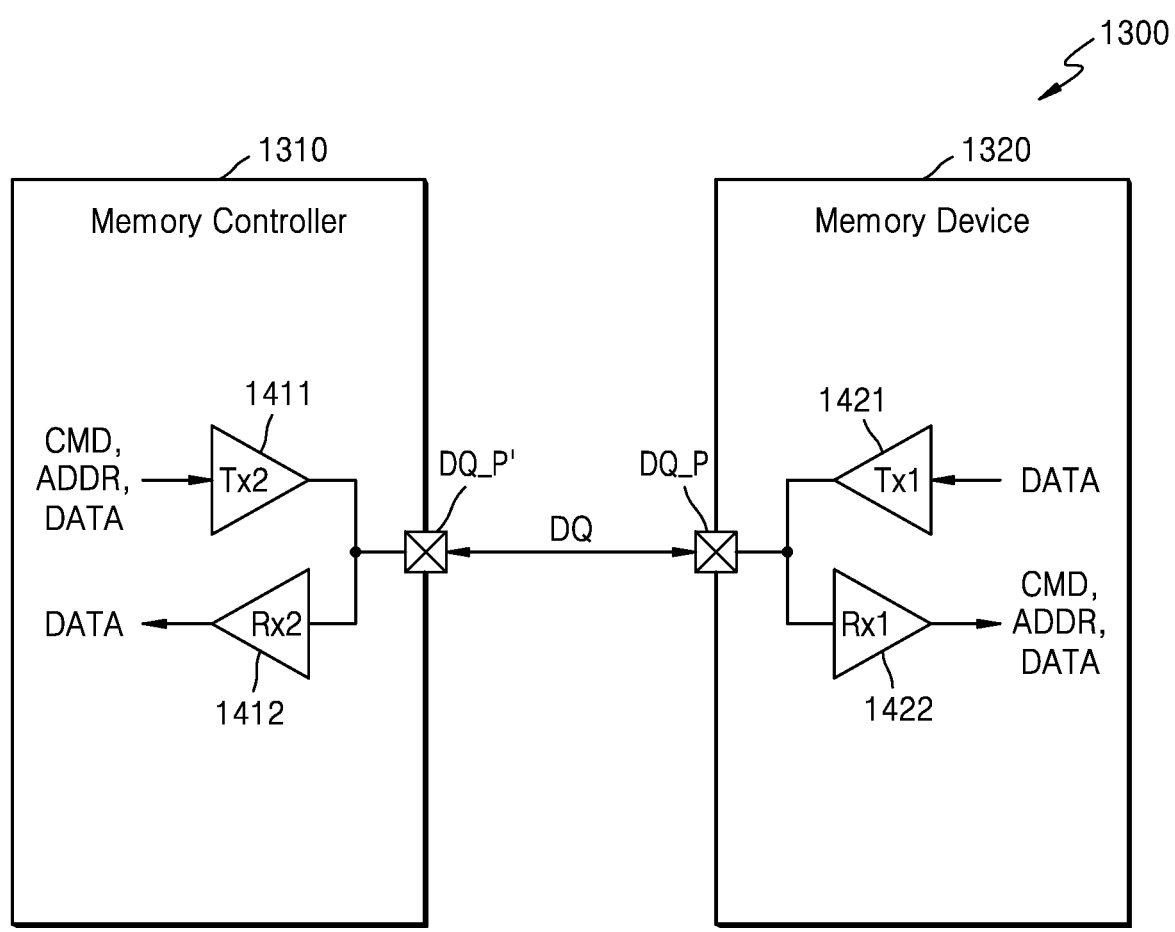
FIG. 17 is a diagram for explaining a communication operation in the memory system of FIG. 16.

FIG. 17 is a diagram for explaining a communication operation in the memory system of FIG. 16. Referring to FIG. 17, a memory device 1320 may include a DQ pin DQ_P, a first transmitter 1421, and a first receiver 1422. The DQ pin DQ_P may correspond to the seventh pin P17 of FIG. 16. For example, when the seventh pin P17 includes a plurality of pins, the DQ pin DQ_P may correspond to one of the plurality of pins.

The first transmitter 1421 may generate a data signal DQ based on data DATA and transmit the data signal DQ to a memory controller 1310 through the DQ pin DQ_P. The first transmitter 1421 may generate the data signal DQ using an N-level pulse amplitude modulation (e.g., PAM-N) scheme. For example, the first transmitter 1421 may use one of PAM-4, PAM-8, and PAM-16 schemes.

The first receiver 1422 may receive the data signal DQ from the memory controller 1310 through the DQ pin DQ_P and obtain the command CMD, address ADDR, or data DATA from the data signal DQ. In an embodiment, the first receiver 1422 may obtain a command CMD, an address ADDR, or data DATA by sampling the received data signal DQ in the PAM-N mode. For example, in the PAM-N mode, the first receiver 1422 may output a plurality of bits based on the voltage level of the data signal DQ received during a unit interval.

The memory controller 1310 may include a DQ pin DQ_P', a second transmitter 1411, and a second receiver 1412. The DQ pin DQ_P' may correspond to the DQ pin DQ_P of the memory device 1320. When the seventh pin P27 of FIG. 16 includes a plurality of pins, the DQ pin DQ_P' may correspond to one of the plurality of pins.

The second transmitter 1411 may generate a data signal DQ based on the command CMD, address ADDR, and data DATA and transmit the data signal DQ to the memory device 1320 through the DQ pin DQ_P'. In an embodiment, the second transmitter 1411 may generate the data signal DQ in the PAM-N scheme based on the command CMD, address ADDR, and data DATA. The second receiver 1412 may receive the data signal DQ from the memory device 1320 through the DQ pin DQ_P' and obtain data DATA from the data signal DQ.

In an embodiment, a modulation method of the data signal DQ may be determined to conform to a predetermined rule. In this case, the modes of the first receiver 1422 and the second receiver 1412 for sampling the data signal DQ may be determined based on predetermined rules to correspond to modulation schemes of the first transmitter 1421 and the second transmitter 1411. In other embodiment, the memory controller 1310 may transmit signaling information about a modulation method of the data signal DQ to the memory device 1320. The memory device 1320 may determine a modulation method of the first transmitter 1421 and a mode of the first receiver 1422 based on signaling information received from the memory controller 1310. In embodiments, the first receiver 1422 and the second receiver 1412 correspond to the receiver 130 of FIG. 1 and may be implemented as time-based receivers.

While the inventive concept has been particularly shown and described with reference to embodiments thereof, it will be understood that various changes in form and details may be made therein without departing from the spirit and scope of the following claims.

What is claimed is:

1. A receiver, comprising:
   a decoding circuit configured to: convert a data signal into first and second signals having a time difference therebetween, which is a function of at least one parameter, and output decoded data based on the first signal and the second signal; and
   a calibration circuit configured to: calibrate a value of the at least one parameter based on one of the first signal and the second signal, and a reference timing signal, and provide a calibration signal including the calibrated value to the decoding circuit, said reference timing signal having a reference timing that sets a ratio between a first probability and a second probability as an integer ratio, with the first probability being a probability that the decoded data is decoded as a reference symbol among a plurality of symbols, and the second probability being a probability that the decoded data is decoded as any one symbol among the plurality of symbols.

2. The receiver of claim 1, wherein the decoding circuit comprises:
   a differential signal converter configured to convert the data signal into a first differential signal and a second differential signal;
   a voltage to time converter configured to sequentially output a first conversion signal and a second conversion signal having a time difference therebetween that corresponds to a voltage level difference between the first differential signal and the second differential signal, and is based on the first differential signal and the second differential signal;
   a decision feedback equalization (DFE) circuit configured to adjust the time difference and output the first signal and the second signal having the adjusted time difference, based on the first conversion signal, the second conversion signal, and previously decoded data; and
   a decoder configured to determine a bit value of the decoded data based on a first-arrived signal, which is a first input signal among the first and second signals.

3. The receiver of claim 2, wherein the at least one parameter includes a reference voltage level; and wherein the differential signal converter is configured to receive a first calibration signal including the reference voltage level, and output the first differential signal and the second differential signal based on a comparison result between the voltage level of the data signal and the reference voltage level.

4. The receiver of claim 2,
   wherein the at least one parameter includes a voltage time gain representing a ratio of edge timing to a unit voltage level; and
   wherein the voltage to time converter is configured to: receive a second calibration signal including the voltage time gain, output the first conversion signal having a first edge timing for a first voltage level of the first differential signal using the voltage time gain, and use the voltage time gain to output the second conversion signal having a second edge timing for a second voltage level of the second differential signal.

5. The receiver of claim 2, wherein the at least one parameter includes at least one code for adjusting a DFE tap coefficient; and wherein the DFE circuit receives a third calibration signal including the at least one code; and wherein changes in an adjustment amount for adjusting the time difference are based on the at least one code and bit values of previously decoded data.

6. The receiver of claim 1, wherein the at least one parameter includes a first parameter and a second parameter; and wherein the calibration circuit is configured to alternately calibrate the first parameter and the second parameter every plurality of calibration cycles.

7. The receiver of claim 6, wherein the calibration circuit is configured to: calibrate the first parameter based on the first signal and the reference timing signal in a first calibration cycle, and calibrate the second parameter based on the second signal and the reference timing signal in a second calibration cycle after the first calibration cycle.

8. The receiver of claim 6, wherein the at least one parameter further includes a third parameter; and wherein the calibration circuit is configured to calibrate the third parameter after completing calibration of each of the first parameter and the second parameter through the plurality of calibration cycles.

9. The receiver of claim 1,
   wherein the at least one parameter includes: a first parameter representing a reference voltage level, a second parameter representing a voltage time gain representing a ratio of edge timing to a unit voltage level, and a third parameter representing at least one code for adjusting a decision feedback equalization (DFE) tap coefficient; and
   wherein the calibration circuit includes:
      a selector configured to output a selection signal selected from among the first signal and the second signal;
      a reference timing signal generator configured to generate the reference timing signal based on a clock signal;
      a time comparator configured to output a first output signal and an inverted comparison signal obtained by inverting the first output signal based on a first-arrived signal, which is a first input signal among the selection signal and the reference timing signal;
      a coefficient weight controller configured to receive the inverted comparison signal and output a second output signal whenever the inverted comparison signal is input as many times as a number of inputs corresponding to the integer ratio;
      a DFE controller configured to output a third output signal based on previously decoded data; and
      a counter group configured to output at least one of a first calibration signal, a second calibration signal, and a third calibration signal based on the first output signal, the second output signal, and the third output signal.

10. A method of operating a receiver, comprising:
    converting a data signal into a first signal and a second signal having a specific time difference based on at least one parameter;
    calibrating a value of the at least one parameter based on one of the first signal and the second signal and a reference timing signal, wherein the reference timing signal has a reference timing for setting a ratio between a first probability and a second probability as an integer ratio, with the first probability being a probability that decoded data is decoded as a reference symbol among a plurality of symbols, and the second probability being a probability that the decoded data is decoded as any one symbol among the plurality of symbols; and
    outputting decoded data based on the first signal and the second signal.

11. The method of claim 10,
wherein the calibrating of the value of the at least one parameter includes:
outputting a selection signal by selecting one of the first signal and the second signal;
generating the reference timing signal based on a clock signal;
outputting a first output signal and an inverted comparison signal obtained by inverting the first output signal based on a first-arrived signal, which is a first input signal among the selection signal and the reference timing signal;
outputting a second output signal whenever the received inverted comparison signal is input as many times as a number of inputs corresponding to the integer ratio;
outputting a third output signal based on previously decoded data; and
outputting at least one calibration signal among a first calibration signal, a second calibration signal, and a third calibration signal based on the first output signal, the second output signal, and the third output signal.

12. The method of claim 10, wherein the at least one parameter includes a first parameter and a second parameter; and wherein the calibrating of the value of the at least one parameter includes alternatingly calibrating the first parameter and the second parameter every plurality of calibration cycles.

13. The method of claim 12, wherein the alternately calibrating of the first parameter and the second parameter includes: calibrating the first parameter based on the first signal and the reference timing signal in a first calibration cycle, and calibrating the second parameter based on the second signal and the reference timing signal in a second calibration cycle after the first calibration cycle.

14. The method of claim 12, wherein the calibrating of the value of the at least one parameter further includes calibrating a third parameter after completing calibration of the first parameter and the second parameter through the plurality of calibration cycles.

15. The method of claim 10, wherein the at least one parameter includes: a first parameter representing a reference voltage level, a second parameter representing a voltage time gain representing a ratio of edge timing to a unit voltage level, and a third parameter representing at least one code for adjusting a decision feedback equalization (DFE) tap coefficient.

16. A memory device, comprising:
a memory interface circuit configured to receive a data signal from a memory controller; and
a control logic circuit configured to perform a control operation based on the data signal provided from the memory interface circuit;
wherein the memory interface circuit includes:
a decoding circuit configured to convert a data signal into a first signal and a second signal having a specific time difference based on at least one parameter, and further configured to output decoded data based on the first signal and the second signal; and
a calibration circuit configured to calibrate a value of the at least one parameter based on one of the first signal and the second signal and a reference timing signal, and further configured to provide a calibration signal including the calibrated parameters to the decoding circuit; and
wherein the reference timing signal has a reference timing for setting a ratio between a first probability and a second probability as an integer ratio, the first probability being a probability that the decoded data is decoded as a reference symbol among a plurality of symbols, and the second probability being a probability that the decoded data is decoded as any one symbol among the plurality of symbols.

17. The memory device of claim 16, wherein the at least one parameter includes a first parameter and a second parameter; and wherein the calibration circuit is configured to alternately calibrate the first parameter and the second parameter every plurality of calibration cycles.

18. The memory device of claim 17, wherein the calibration circuit is configured to calibrate the first parameter based on the first signal and the reference timing signal in a first calibration cycle, and further configured to calibrate the second parameter based on the second signal and the reference timing signal in a second calibration cycle after the first calibration cycle.

19. The memory device of claim 17, wherein the at least one parameter further includes a third parameter; and wherein the calibration circuit is configured to calibrate the third parameter after completing calibration of each of the first parameter and the second parameter through the plurality of calibration cycles.

20. The memory device of claim 16,
wherein the at least one parameter includes a first parameter representing a reference voltage level, a second parameter representing a voltage time gain representing a ratio of edge timing to a unit voltage level, and a third parameter representing at least one code for adjusting a decision feedback equalization (DFE) tap coefficient;
wherein the calibration circuit includes:
a selector configured to output a selection signal selected from among the first signal and the second signal;
a reference timing signal generator configured to generate the reference timing signal based on a clock signal;
a time comparator configured to output a first output signal and an inverted comparison signal obtained by inverting the first output signal based on a first-arrived signal which is a first input signal among the selection signal and the reference timing signal;
a coefficient weight controller configured to receive the inverted comparison signal and output a second output signal whenever the inverted comparison signal is input as many times as a number of inputs corresponding to the integer ratio;
a DFE controller configured to output a third output signal based on previously decoded data; and
a counter group configured to output at least one of a first calibration signal, a second calibration signal, and a third calibration signal based on the first output signal, the second output signal, and the third output signal.

* * * * *